United States Patent
Evans et al.

(10) Patent No.: US 7,627,227 B2
(45) Date of Patent: Dec. 1, 2009

(54) REVERSE PRESENTATION OF DIGITAL MEDIA STREAMS

(75) Inventors: Glenn F. Evans, Kirkland, WA (US); Stephen C. Rowe, Bellevue, WA (US); Robin C. B. Speed, Winchester (GB); Gary J. Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1021 days.

(21) Appl. No.: 10/847,273

(22) Filed: May 17, 2004

(65) Prior Publication Data

US 2005/0257239 A1 Nov. 17, 2005

(51) Int. Cl.
*H04N 5/91* (2006.01)
(52) U.S. Cl. ....................................................... 386/68
(58) Field of Classification Search .................. 386/68, 386/111–112, 109, 33, 95
See application file for complete search history.

(56) References Cited

U.S. PATENT DOCUMENTS

| | | | |
|---|---|---|---|
| 4,661,862 A | 4/1987 | Thompson | |
| 4,689,697 A | 8/1987 | Wilkinson | |
| 5,193,004 A | 3/1993 | Wang et al. | |
| 5,298,992 A | 3/1994 | Pietras et al. | |
| 5,377,051 A | 12/1994 | Lane et al. | |
| 5,535,008 A | 7/1996 | Yamagishi et al. | |
| 5,574,566 A | 11/1996 | Takakura et al. | |
| 5,694,172 A | 12/1997 | Miyano | |
| 5,892,882 A * | 4/1999 | Kuroda et al. | 386/68 |
| 5,959,796 A | 9/1999 | Matsumi et al. | |
| 6,014,706 A | 1/2000 | Cannon et al. | |
| 6,058,241 A * | 5/2000 | Kawamura et al. | 386/68 |
| 6,101,070 A | 8/2000 | Oguro | |
| 6,167,083 A | 12/2000 | Sporer et al. | |
| 6,201,927 B1 | 3/2001 | Comer | |
| 6,247,072 B1 | 6/2001 | Firestone | |
| 6,269,117 B1 | 7/2001 | Peng | |
| 6,327,421 B1 | 12/2001 | Tiwari et al. | |
| 6,654,539 B1 * | 11/2003 | Duruoz et al. | 386/68 |
| 2002/0015577 A1 | 2/2002 | Negishi et al. | |
| 2002/0181588 A1 * | 12/2002 | Okada | 375/240.12 |
| 2003/0007556 A1 | 1/2003 | Oura et al. | |
| 2003/0093801 A1 * | 5/2003 | Lin et al. | 725/90 |
| 2004/0179597 A1 | 9/2004 | Rault | |

FOREIGN PATENT DOCUMENTS

| | | |
|---|---|---|
| JP | 2110783(A) | 4/1990 |
| JP | 7202933 | 8/1995 |
| JP | 7284042 | 10/1995 |
| JP | 9282166(A) | 10/1997 |
| JP | 11039177(A) | 2/1999 |
| JP | 2002010213 | 1/2002 |

(Continued)

OTHER PUBLICATIONS

Doh, et al., "Fast Forward and Fast Rewind Play System Based on the MPEG System Stream with New Concept", IEEE, 1999, pp. 846-850.

(Continued)

*Primary Examiner*—Thai Tran
*Assistant Examiner*—Tat Chi Chio
(74) *Attorney, Agent, or Firm*—Lee & Hayes, PLLC

(57) ABSTRACT

Described herein is an implementation that facilitates the reverse presentation of an encoded digital media stream. This abstract itself is not intended to limit the scope of this patent. The scope of the present invention is pointed out in the appending claims.

43 Claims, 9 Drawing Sheets

FOREIGN PATENT DOCUMENTS

WO        WO9521414        8/1995

OTHER PUBLICATIONS

Tan, et al., "Video Transcoding for Fast Forward/Reverse Video Playback", IEEE ICIP, 2002, pp. I-713 through I-716.

Wee, et al., "Compressed-Domain Reverse Play of MPEG Video Streams", Part of the SPIE Conference on Multimedia Systems and Applications, Boston, Massachusetts, Nov. 1998, SPIE vol. 3528, pp. 237-248.

* cited by examiner

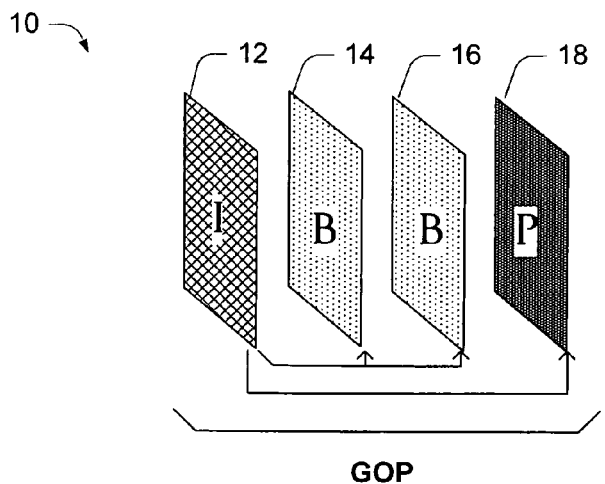
Fig. 1 *(background)*
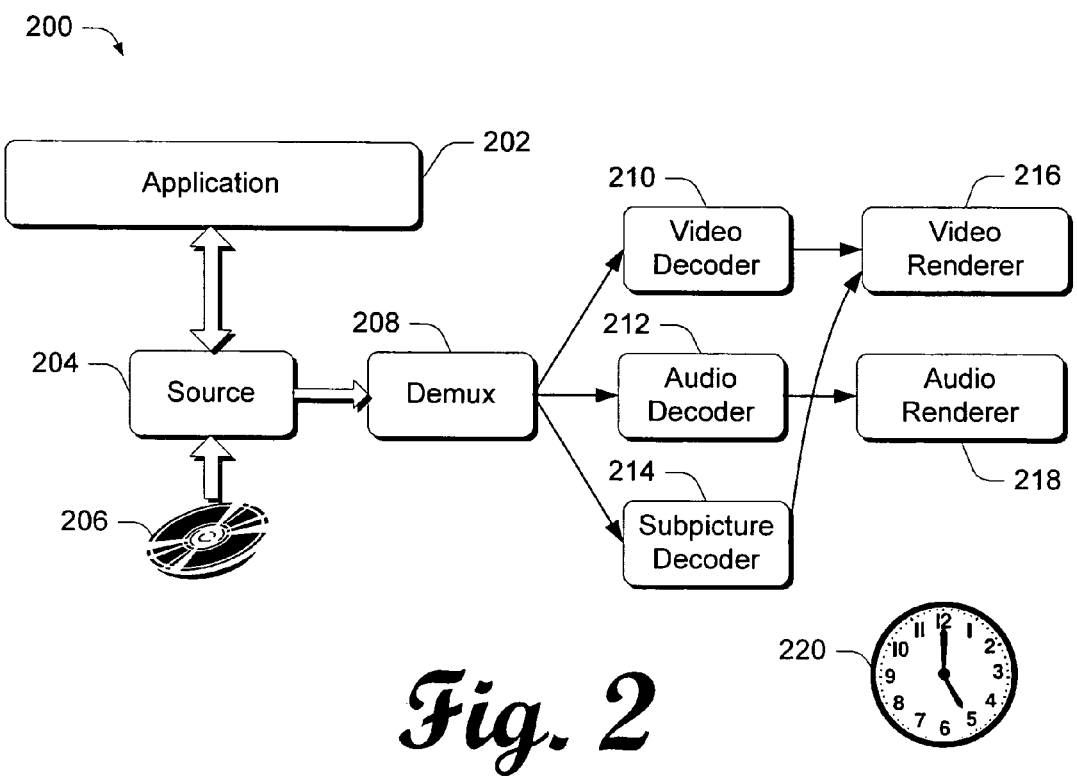
Fig. 2

REVERSE PRESENTATION OF DIGITAL MEDIA STREAMS

TECHNICAL FIELD

This invention generally relates to a digital multimedia technology.

BACKGROUND

As processing and storage technologies continue to improve, many personal computing systems (e.g., personal computers, set-top boxes, etc.) now have the capacity to receive, process and render multimedia objects. Such objects have multimedia content that includes a combination of audio, graphical, and/or video content. The multimedia content may be delivered to the computing system in any of a number of ways including, for example, on a compact disk read-only memory (CD-ROM), on a digital versatile disk read-only memory (DVD-ROM), via a communicatively coupled data network (e.g., Internet), and the like.

Due to the amount of data required to accurately represent such multimedia content, it is typically delivered to the computing system in an encoded, compressed form. To reproduce the original content for presentation, the multimedia content must be decompressed and decoded before it is presented. Here, presenting includes communicating the multimedia content to a display and/or audio device.

A number of multimedia standards have been developed that define the format and meaning of encoded multimedia content for purposes of distribution. Organizations such as the Moving Picture Experts Group (MPEG) under the auspices of the International Standards Organization (ISO) and International Electrotechnical Commission (IEC), and the Video Coding Experts Group (VCEG) under the auspices of the International Telecommunications Union (ITU), have developed a number of multimedia coding standards (e.g., MPEG-1, MPEG-2, MPEG-4, H.261, H.263, and the like).

Simplistically speaking, the encoding process removes spatial and temporal redundancies from the media content, thereby reducing the amount of data needed to represent the media content and, as a result, reducing the bandwidth burden to store and/or transmit such media content. Examples of the encoding process include entropy decoding, motion compensated prediction, inverse quantization, inverse transformation, and addition of the inverse transformed results to the prediction.

Conversely, the decoding process is, simplistically speaking, typically the inverse of the encoding process.

Rendering typically includes an additional step of digital to analog conversion (with filtering). That generates an approximate representation of the original analog media signal.

Herein, a "media stream" is a multimedia object (containing audio and/or visual content) that is compressed and encoded in accordance with generally available mechanisms for doing so. Furthermore, such a media stream is intended to be decoded and rendered in accordance with generally available mechanisms for doing so.

Without a loss of generality, the same techniques can be applied to any media stream that has a similar structure which reduces temporal or spatial redundancies. For example, many audio compression formats have keyframes followed by modification data to regenerate an approximation of the original uncompressed stream.

There are many different video-stream data formats. For example: H.263, MPEG-1, MPEG-2, MPEG-4 Visual, H.264/AVC, and DV formats.

There are many different audio-stream data formats. For example: DTS audio or MLP audio.

MPEG-2/H.262

The predominant digital video compression and transmission formats are from a family called block-based motion-compensated hybrid video coders, as typified by the ISO/IEC MPEG-X (Moving Picture Experts Group) and ITU-T VCEG H.26X (Video Coding Experts Group) standards. This family of standards is used for coding audio-visual information (e.g., movies, video, music, and such) in a digital compressed format.

For the convenience of explanation, the MPEG-2 video stream (also known as an H.262 video stream) is generally discussed and described herein, as it has a structure that is typical of conventional video coding approaches. However, those who are skilled in the art understand and appreciate that other such digital video compression and transmission formats exist and may be used.

The MPEG-2 format may be referred to as a generally "forward decoding" format. An example representation of a MPEG format is shown in FIG. 1 generally at 10. Each video sequence is composed of a sequence of frames that is typically called Groups of Pictures (or "GOPs"). A GOP is composed of a sequence of pictures or frames. The GOP data is compressed as a sequence of I-, P- and B-frames where:

An I-frame (i.e., intra-frame) is an independent starting image—(compressed in a similar format to a JPEG image). An I-frame or "key frame" (such as I-frame 12) is encoded as a single image, with no reference to any past or future frames. An I-frame is considered a "reference frame" in MPEG-2, as its content can be used in the decoding process for one subsequent P-frame or multiple subsequent B-frames in decoding order.

A P-frame (i.e., forward predicted frame) is computed by moving around rectangles (called macroblocks) from the previous I- or P-frame then (if so indicated by the encoder) applying a 'correction' called a residual. Subsequent P-frames (such as P-frame 18) is encoded relative to the past reference frame (such as a previous I- or P-frame). P-frames can also be considered as "delta frames" in that they contain changes relative to their reference frame. A P-frame is also considered a "reference frame" in MPEG-2, as its content can be used in the decoding process for one subsequent P-frame or multiple subsequent B-frames in decoding order.

Zero or more B-frames (i.e., bi-directional predicted frames, such as frames 14 and 16) are formed by a combination of rectangles from the adjacent I- or P-frames, followed (if so indicated by the encoder) by a correction factor. Several B-frames may lie between a pair of reference frames (frames that are either I- or P-frames). In MPEG-2, B-frames are not called reference frames, as they are not used as references for the decoding of subsequent frames in decoding order.

The GOP structure is intended to assist random access into the stream. A GOP is typically an independently decodable unit that may be of any size as long as it begins with an I-frame.

One problem associated with the MPEG-2 format pertains to being able to play back the data in the reverse of the ordinary display order. Playing the data forward is typically not a problem because the format itself is forward decoding—meaning that one must typically decode the I-frame first and then move on to the other frames in the GOP. Playing back the data in reverse, however, is more challenging because the GOPs inherently resist a straightforward backward-decoding.

Similar challenges exist to audio data which are compressed as a starting vector of values (i.e. one per audio channel) followed by delta frames.

DVD

Normally, when images are recorded on a disk, such as a DVD, the content is actually broken into small units covering a pre-determined time period (typically approximately ½-second units or video object basic units ("VOBUs")). The advantage of this format is that when you play the video, you can progress through the video units one by one. If one wants to jump to an arbitrary piece of video, one can simply jump to the video unit of interest and the audio and video will be synchronized. The location at which all streams are synchronized is referred to as a "clean point". Accordingly, when the video and audio units are compressed, they are compressed in a unit that is to be rendered at the exact same time—that is, there is no skew between the audio and video.

All references to I-frames, when discussed within the MPEG-2 context may be extended to key-frames in other data formats. The term I-frame is synonymous with a key-frame when discussed outside of the MPEG-2 context.

Exemplary Media-Stream Rendering System

FIG. 2 illustrates an exemplary system 200 that can render data from a media stream source, such as a DVD. System 200 includes an application 202 that communicates with a source component 204 that reads data off of a DVD 206. The data that is read off of the DVD includes audio and video data that has been encoded and multiplexed together.

As the source reads the data off of the DVD, it retrieves timestamps from the data packets, which are then used to synchronize and schedule the packets for rendering. The packets are then provided to a demultiplexer (or "demux") 208 which splits the packets into different constituent portions—audio, video and, if present, subpicture packets.

The packets are then provided by the demultiplexer to an associated decoder, such as video decoder 210 (for decoding video packets), audio decoder 212 (for decoding audio packets) and subpicture decoder 214 (for decoding subpicture packets). Each one of the packets has associated timing information, which defines when the contents of the packet are supposed to be rendered. These packets may be a GOP (as described above with regard to MPEG).

The decoders then decompress their associated packets and send the individual data samples or packets (including the packets' timestamps) to the appropriate renderers, such as video renderer 216 and audio renderer 218. Each of these decoders typically has a cache for temporarily storing decoded packets (or portions thereof). Typically, a cache is at least large enough to accommodate frame decoding that references data from other frames.

System 200 also typically includes a global clock 220 that is used by the various renderers to ascertain when to render certain data samples whose timestamps coincide with a time indicated by the global clock.

Reverse Playback

Assume now that a user indicates, via application 202, that she wishes to view the content in reverse order. This may be called "reverse playback," "backwards play", "rewind," "backwards scan," "reverse trick play," or "reverse scan."

The frames of a GOP are designed to be decoded and presented in generally the same direction, which will be called the "forward" direction herein. That is the same direction in which the frames of the GOP are encoded. However, the actual specific order that, the frames of a GOP are encoded typically differs from the actual specific order of their presentation.

To decode a B-frame (such as frames 14 and 16 of FIG. 1), the previous I-/P-frame and the next I-/P-frame must already be present. For example, a GOP may be presented in this order $I_1B_2B_3P_4B_5P_6$, but it would be encoded in the order $I_1P_4B_2B_3P_6B_5$. Note that $P_4$ must be decoded before $B_2$ and $B_3$ may be generated. $P_4$ must be decoded in order to generate $P_6$.

Consequently, simply reversing the decoding order is insufficient to produce reverse playback of the GOP. In the above example, the $P_6$ depends on the previous $P_4$ frame, which hasn't yet been decoded, if decoding occurs backwards. Furthermore, the $P_4$ depends on the previous $I_1$ frame, which also hasn't yet been decoded, if decoding occurs backwards. Further still, the B-frames depend on one or more frames that haven't been decoded yet when decoding in reverse.

In light of this, one conventional approach to the "reverse playback" of a GOP involves a reverse presentation of the frames in the GOP so that before each frame presentation, all of the frames (or at least all of the reference frames) that proceed the current frame are decoded. For example, for frames labeled ABCDE, this conventional approach decodes frames ABCDE, and then displays frame E. Next, it decodes frames ABCD, and then displays D. Next, it decodes ABC, and then displays C, and so forth.

This conventional approach is highly time-consuming and it is very inefficient since the system is decoding some of the same frames repeatedly. The computations requirements are very high, but memory requirements are relatively low.

Another conventional approach to the "reverse playback" of a GOP is to decode forward as normal but temporarily store all of the decoded and now uncompressed frames of the GOP. Once the entire GOP is decoded and stored, the decoded frames are passed on to the renderers in reverse order. Therefore, stored output frames are simply displayed in reverse order.

With this approach, the computations requirements are relatively low, but memory requirements are relatively high. This conventional approach requires:

A large amount of cache memory to cache the uncompressed images of the decoded frames of the GOP. Even for common formats such as DVD, or standard definition TV, 10 MB or more of cache memory may be necessary. Higher HDTV resolutions typically require 50 MB of memory.

The cache memory is typically located in high-speed memory that is accessible to the decoder unit. The random rectangle extractions produce very cache-unfriendly accessing patterns. Typically, this memory will need to be in the typically expensive and limited local video memory (VRAM) on a video card.

Since the GOPs typically need to be pipelined using at least double caching to ensure a constant output speed, the memory requirements of the cache memory are typically doubled. While the overall decoding speed for a block in reverse is the same as one played forwards at the same speed, the decoder will need to almost instantly decode the block, and then play it in reverse at normal speed. By having a fully decoded GOP in memory, the decoder unit has a GOP worth of presentation time to decode the next GOP.

Furthermore, post-processing of the content (such as de-interlacing, scaling, filtering, audio pitch correction, etc.) may require additional computational power and temporary processing caches.

In recognition of the difficulties involved in reverse playback, some conventional approaches simply decode and display only the key-frames (e.g., I-frames) from each GOP. This produces a jerky slide-show-like reverse presentation of still images appearing in the video stream. While straightforward, this simplistic approach is ungraceful and utterly fails at simulating reverse motion of the video content of the video stream.

SUMMARY

An implementation is described herein that facilitates the reverse presentation of an encoded digital media streams.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

FIG. 1 is a block diagram illustrating a group-of-pictures (GOP) that may be used in accordance with an implementation described herein.

FIG. 2 is a block diagram of a system in accordance with an implementation described herein.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of the present invention, thereby better explaining the present invention. Furthermore, for ease of understanding, certain method steps are delineated as separate steps; however, these separately delineated steps should not be construed as necessarily order dependent in their performance.

The following description sets forth one or more exemplary implementations of a Reverse Presentation of Digital Media Streams that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a Reverse Presentation of Digital Media Streams may be referred to as an "exemplary reverse presenter."

Introduction

Figure 10:
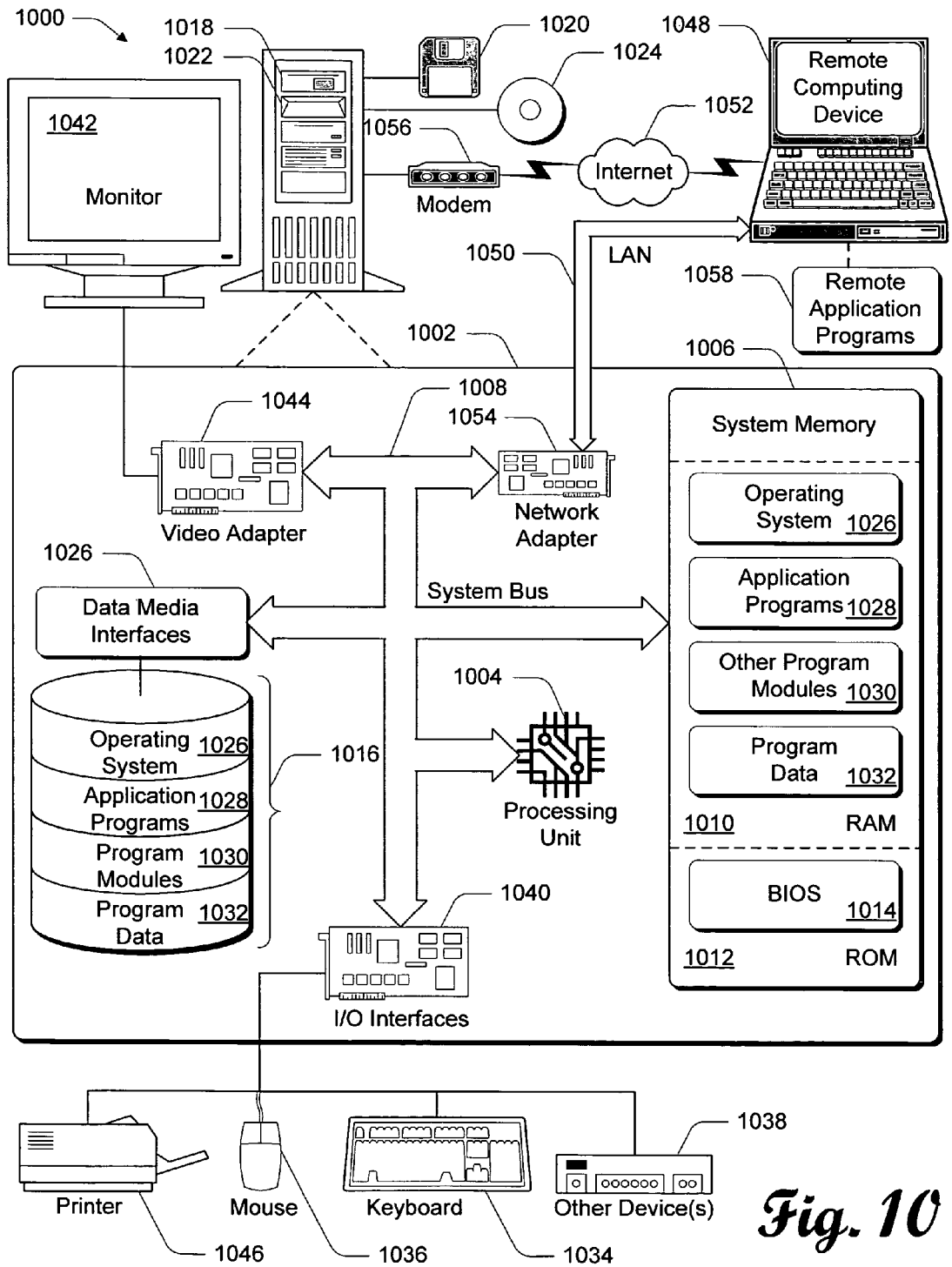
FIG. 10 is an example of a computing operating environment capable of (wholly or partially) implementing at least one embodiment described herein.

The one or more exemplary implementations, described herein, of the present claimed invention may be implemented (in whole or in part) by the media stream rendering system 200, a presentation device 708, and/or as part of a computing environment like that shown in FIG. 10.

The exemplary reverse presenter facilitates the reverse playback of compressed digital media streams. Most media stream formats are compressed using independently decodable blocks containing a sequence of frames. For convenience, such a block is called a block-of-frames (BOF) herein. In MPEG, a groups-of-pictures (GOP) is an example of such a BOF. Note that BOFs may share frames (i.e. overlap) with adjacent BOFs in some situations (such as an open GOP in MPEG2).

Herein, a "frame" refers to a compressed unit of media data (typically audio and/or visual data). The overall encoding process reduces temporal or spatial redundancies within the media data of the frames of the BOF. When a frame is decoded (or uncompressed), its media data is fully represented without any compression (from temporal or spatial redundancy reduction).

Each BOF typically includes at least one key-frame (e.g., I-frame) or reference vector that is followed by several delta frames. Similar procedures can be used to decode various media streams such as audio which are compressed using a similar structure.

The conventional approach to reverse playback of a stream is typically to decode a BOF in a "forward" direction as normal but cache all of the decoded and now uncompressed frames of the entire BOF. Once the entire BOF is decoded and cached, the decoded frames are presented in reverse order.

This conventional and straightforward approach works for relatively small uncompressed frame sizes and short BOF lengths. However, as the uncompressed frame size increases, such as in the case of decoding HDTV images, the temporary memory requirements may become prohibitive.

For interlaced 1920×1080 pixel images with ½ second long BOFs, over 300 MB of memory are required to memorize the frames. Even worse, the cached images must be located within the decoder's local memory (rather than on a main memory). The memory bandwidth required to copy the decompressed images to a main memory often exceeds the bandwidth of a system's internal buses.

Simply adding more local cache memory is economically counterproductive since it only increases the component costs. At some point, this brute-force solution (of adding more memory) will become cost prohibitive.

The exemplary reverse presenter facilitates improved reverse presentation of a stream by performing more efficient reverse decoding of the BOFs of the media stream. It also balances computational and memory requirements, so that the content can still be reverse decoded if memory or computational resources are limited.

Exemplary Reverse Presenter

Figure 7:
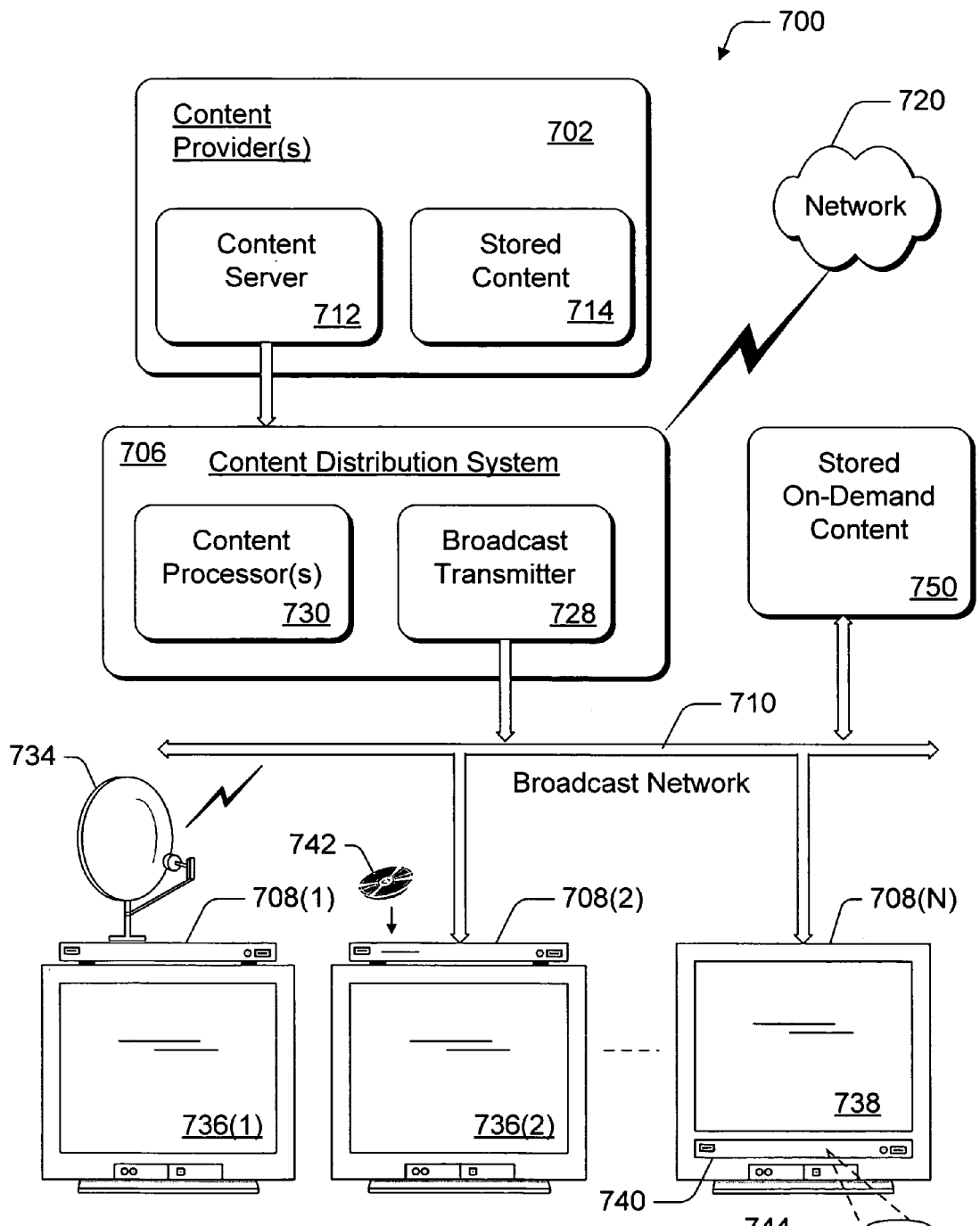
FIG. 7 illustrates an exemplary environment in which an implementation described herein may be employed.
Figure 9:
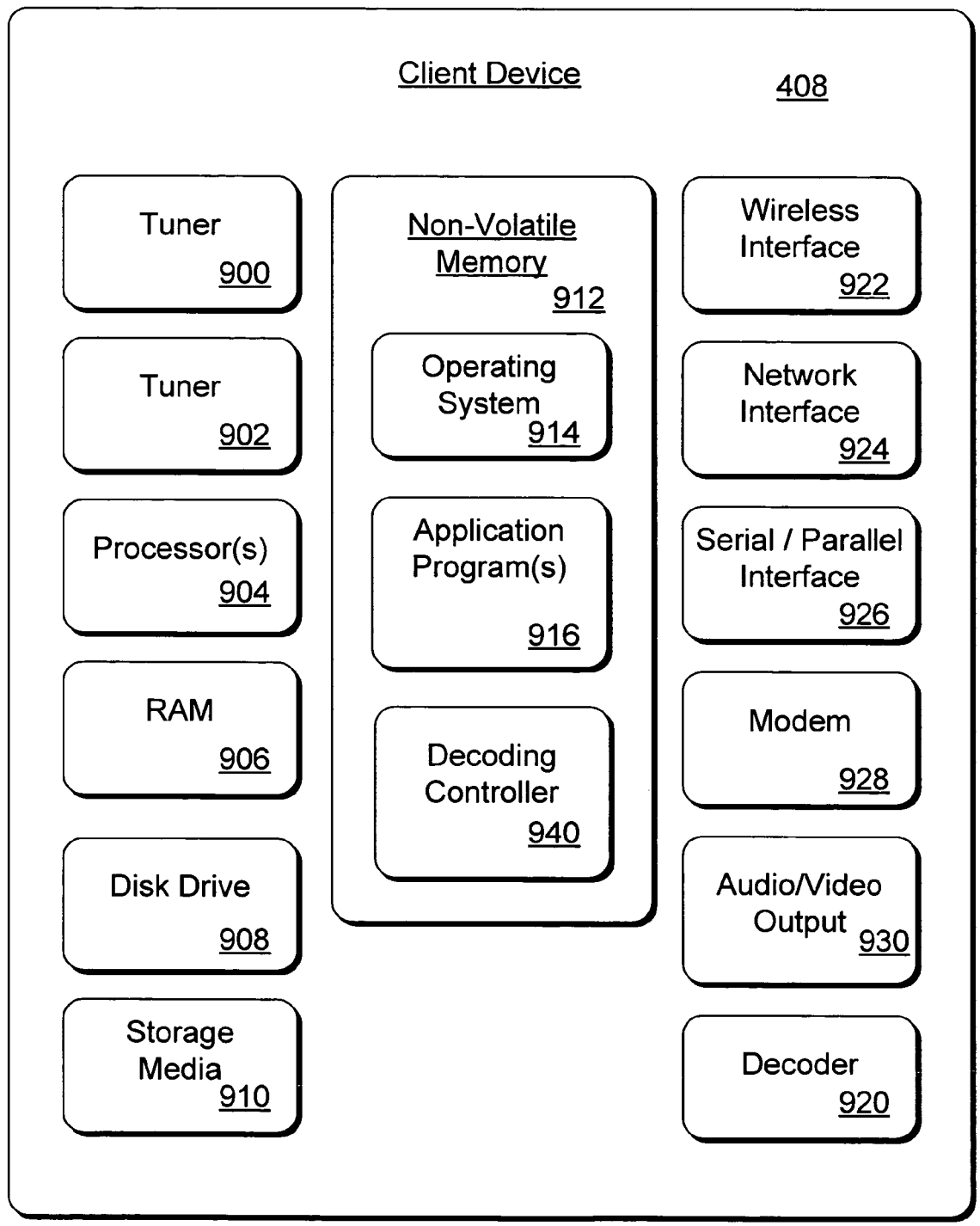
FIG. 9 is a block diagram that illustrates components of the example presentation device(s) shown in FIGS. 7 and 8.

The exemplary reverse presenter may be implemented (in whole or in part) by the media stream rendering system 200 of FIG. 2, a presentation device 708 of FIGS. 7 and 9, and/or as part of a computing environment like that shown in FIG. 10.

The stream decoding function of the exemplary reverse presenter may occur on a decoding unit with limited memory that accepts compressed multimedia data of video and audio streams. The decoding unit comprises a decoding controller (such as controller 940 of FIG. 9) and a hardware decoder (such as decoders 210, 212, and 214 of FIG. 2 or decoder 930 of FIG. 6).

A decoder controller (such as controller 940 of FIG. 9) controls the decoding process. It schedules frames to be decoded by the decoder. The decoder controller may be performed in software, hardware, or a combination thereof. It may be as a program module on the presentation device 708 and/or as part of a computing environment like that shown in FIG. 10

A decoder (such as decoders 210, 212, and 214 of FIG. 2 or decoder 930 of FIG. 6) is a dedicated decompression/decoding hardware, a software component that performs the equivalent operation, or a combination of both. Since decoding is typically handled by dedicated hardware, it is often possible to decode (or re-decode frames) more rapidly than necessary for the frames to be displayed.

Herein, the term "frame-buffer" refers to a memory storage location configured to store one uncompressed frame. Herein, a "cache" is a memory storage. A cache may contain frame-buffers.

Reference and Non-Reference Frames

A "reference frame" is a type of frame having data that is used as a reference to generate a frame dependent therefrom. A reference frame typically must be decoded before its data may be referenced. A key-frame is always a reference frame. However, intermediate frames, which are dependent on key-frames, but also have one or more frames dependent therefrom, are also classified as reference frames. In the MPEG realm, both I- and P-frames are categorized as reference frames.

A "non-reference frame" is a type of frame containing no data referenced by another frame. In addition to the data contained in a non-reference frame, the generation of the fully decoded image in the frame depends upon the data of its decoded reference frames. In the MPEG realm, B-frames are categorized as non-reference frames since no frames depend upon them, but they depend upon two reference frames (I- or P-frames). A non-reference frame is typically decoded then discarded and does not need to be temporarily stored for the purpose of decoding other frames.

Aspects of the Exemplary Reverse Presenter

The aspect of the exemplary reverse presenter, described below (with regard to section titled, "Decoding Reference Frames, but Caching Encoded Non-Reference Frames"), focuses on improved handling of non-reference frames (e.g., B-frames) relative to the reference frames (e.g., I-/P-frames). In doing so, it provides an improved approach to reverse playback of a media stream.

Conversely, another aspect of the exemplary reverse presenter, described below (with regard to section titled, "Decoding and Caching of Selective Reference Frames"), focuses on improved handling of the reference frames (e.g., I-/P-frames) to produce an improved approach to reverse playback of a stream. The improvement provided by this aspect is not based upon its handling of non-reference frames (e.g., B-frames). However, both aspects of the exemplary reverse presenter may be employed together. And, indeed, it may be desirable to utilize both aspects concurrently to further improve the overall reverse playback function.

Decoding Reference Frames, but Caching Encoded Non-Reference Frames

This aspect of the exemplary reverse presenter achieves an improved reverse playback of a BOF (such as a GOP) by forward decoding some or all of the reference frames (e.g., I- or P-frames) of the BOF while caching the still-encoded (thus still-compressed) non-reference frames (e.g., B-frames).

As the exemplary reverse presenter presents the frames of the BOF in reverse order, it presents the already decoded reference frames, but before presenting the non-reference frames, it decodes the still-encoded non-reference frames in the cache based upon their already decoded reference frames.

I-frames are decoded independent of any previous or future frame information. P-frames are a forward modification of a previous I- or P-frames. Since B-frames only depend on the adjacent frames I-/P-frames, then B-frames may be decoded backwards by exchanging the frame indices of the adjacent frames and decoding them forwards.

For example, suppose a resulting macroblock MB in the B-frame was a function from a macroblock $MP_1$ from the previous P-frame and a macroblock $MP_2$ from the next P-frame. If the B-frame is decoded forwards then: MB=function1($MP_1$, $MP_2$). However, when the indices of the B-frame are swapped, it is now decoded like this: MB=function2($MP_2$, $MP_1$), where function2 is function1 with its operands exchanged.

Hence, the decoded macroblock of a B-frame may be generated by reversing the decoding order of the adjacent frames and applying the same residual correction.

The exemplary reverse presenter caches the compressed form of the non-reference frames (e.g., B-frames). When the BOF-frames are being presented in reverse order, cached compressed non-reference frames are then decoded. The dependencies for decoding non-reference frames are resolved when the data of the non-reference frames is needed for rendering, rather than well in advance.

The non-reference frames may be stored in a main system memory, a local memory to improve access speed (such as VRAM), or in easily accessible system memory to the decoder unit (such as AGP memory). Any of these may be generically called a cache herein.

For example, if a typical BOF playback structure of IBBPBBPBBPBBI (where the last I is shared by an adjecnt BOF) is used, then the memory requirements for reverse playback may be about one-third of what is required by the conventional approach of caching all decoded frames of a BOF. In this example, the exemplary reverse presenter caches decoded versions of only four of the ten frames, rather than all ten frames. In particular, it caches decoded versions of the I- and P-frames.

The exemplary reverse presenter stores the compressed form of the six B-frames in this example. Of the three types (I-, P-, and B-frames), the B-frames represent the most compressed type of frame because they are dependent upon two other frames. Avoiding the temporary storage of the decompressed data of the B-frames represents a significant reduction in the memory requirements of the traditional approach of caching all decoded frames of a BOF.

For this aspect of the exemplary reverse presenter, the specific BOF structure is the typical BOF structure of IBBPBBPBBP. This is a common BOF structure, but those of ordinary skill in the art understand and appreciate that other BOF structures are possible and further understand and appreciate how this aspect may be applied to those other possible structures.

Another way to retain (or effectively "cache") the non-reference frames in compressed form is to simply leave them on whatever storage medium that the video data arrived on. For example, the frames may be left on a DVD or hard drive and their locations be read when desired.

Methodological Implementation of the Exemplary Reverse Presenter

Figure 3:
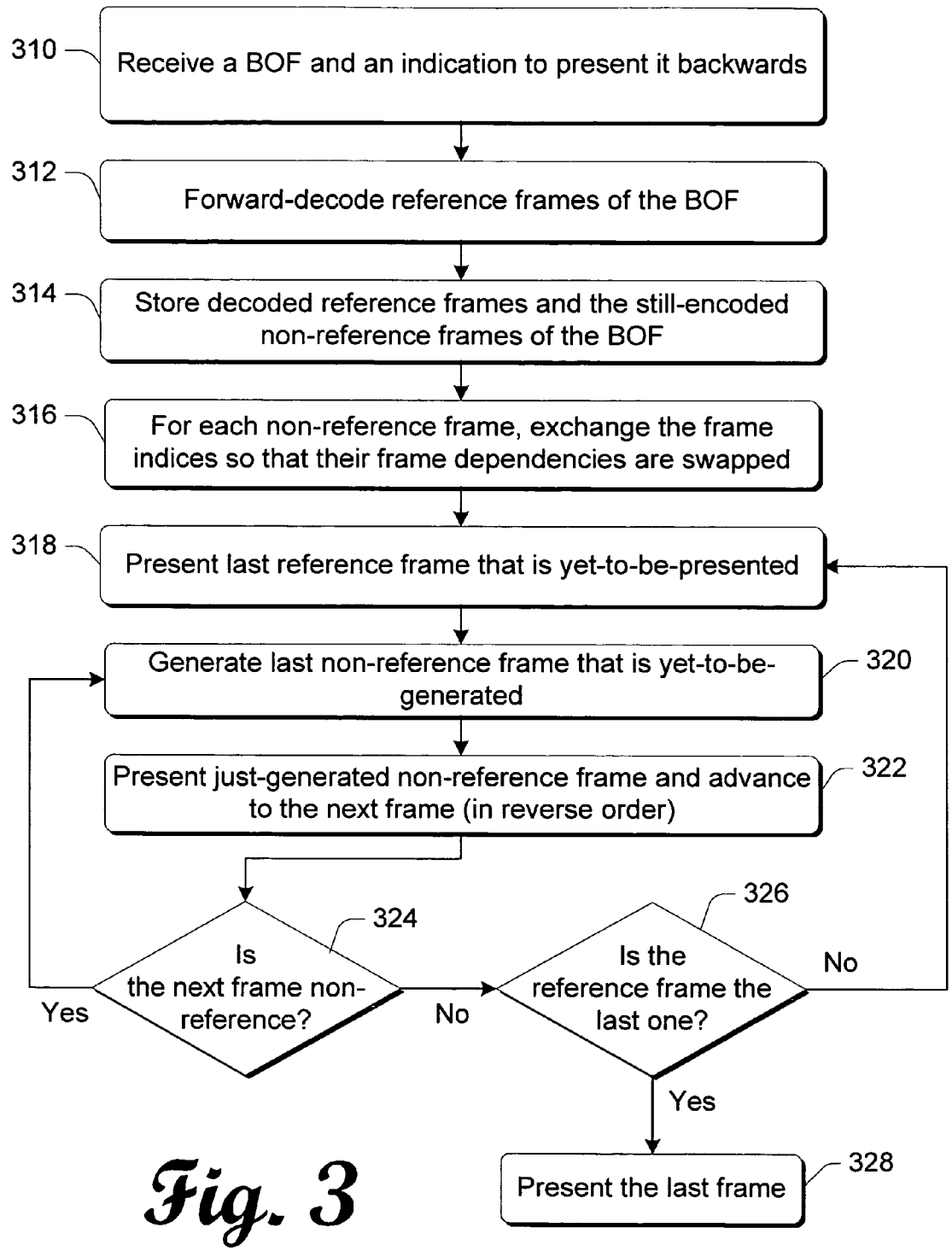
FIG. 3 is a flow diagram showing a methodological implementation described herein.

FIG. 3 shows a methodological implementation of the exemplary reverse presenter for reverse playback that includes decoding reference frames, but caches encoded non-reference frames. This methodological implementation may be performed in software, hardware, or a combination thereof.

At 310 of FIG. 3, the exemplary reverse presenter receives a BOF and an indication that the received BOF is to be presented backwards (i.e., reverse playback).

At 312, the exemplary reverse presenter forward decodes reference frames of the received BOF.

At 314, the exemplary reverse presenter stores decoded reference frames of the BOF and the still-encoded non-reference frames.

At 316, for each non-reference frame, it exchanges the frame indices of the adjacent frames. Therefore, it reverses the dependencies for the non-reference frames.

At 318 of FIG. 3, the exemplary reverse presenter presents the last reference frame of the BOF that is yet-to-be-presented.

At 320, the exemplary reverse presenter generates the last non-reference frame of the BOF that is yet-to-be-generated. The just-generated non-reference frame is decoded based upon its dependencies to already-decoded reference frames in the cache.

At 322, it presents the just-generated non-reference frame and optionally, frees the frame-buffer storing the just-generated non-reference frame. Since the just-generated non-reference frame is no longer needed for presentation or for further decoding of any other frame, the memory holding it can be freed-up for other uses. It also advances to the next frame (in a reverse direction).

At 324, if the next frame is a non-reference frame, then it repeats blocks 320 and 322 for each non-reference frame occurring in reverse order. If not, then it goes to block 326.

At 326, if the next frame is a reference frame, then it determines if it is the last frame (in the reverse direction, but it would have been the first in the forward direction) of the BOF. If so, it goes to block 328. If not, the next frame is just another reference frame and the process goes to block 318.

At 328 of FIG. 3, the exemplary reverse presenter presents the last frame (in the reverse direction, but it would have been the first in the forward direction). With regard to this BOF, this process ends.

Exemplary Operation

To play a BOF in reverse order in accordance with the methodological implementation of FIG. 3, the exemplary reverse presenter receives an example BOF comprised of the frames $I_1B_2B_3P_4B_5B_6P_7B_8B_9P_{10}$. It also receives an indication that the BOF is to be presented in reverse.

The exemplary reverse presenter forward-decodes the reference frames and temporarily stores them in a cache. In this example, it forward decodes and caches these references frames: $I_1P_4P_7P_{10}$ In addition to temporarily storing the uncompressed version of the reference, the exemplary reverse presenter also stores the compressed forms of the non-reference frames into a cache, namely $B_2B_3$, $B_5B_6$, and $B_8B_9$. It also exchanges the frame indices of the non-reference frames so that their frame dependences are swapped. This is done so that the decoded macroblock of the B-frames is generated with a reverse decoding order of the adjacent frames while still applying the same residual correction.

The exemplary reverse presenter schedules the stored and decoded $P_{10}$ for presentation (e.g., rendering and display).

It generates $B_9$ based upon $P_7$ and $P_{10}$. The generation is a decoding or decompression based upon $B_9$ dependency upon $P_7$ and $P_{10}$.

It schedules the stored and now-decoded $B_9$ for presentation, and, optionally, moves the memory allocated for $B_9$ back into a free pool.

Since the next frame (when going in reverse) is another non-reference frame (it is $B_8$), the above two actions (of generation and presentation of a B-frame) are repeated for $B_8$.

After $B_9$ and $B_8$ are decoded and presented, $P_{10}$ is no longer needed (because it has been presented already and it is no longer used for dependency decoding). Therefore, it may free the memory for $P_{10}$.

The above actions that operated on the set of $P_7B_8B_9P_{10}$ are repeated for the next set (when going in reverse): $P_4B_5B_6P_7$.

The above actions that operated on the set of $P_7B_8B_9P_{10}$ are now repeated for the next set (when going in reverse): $I_1B_2B_3P_4$.

Finally, the exemplary reverse presenter schedules the stored and decoded $I_1$ for presentation. Since $I_1$ is the last frame (in reverse order), its presentation completes the reverse playback of example BOF comprised of the frames $I_1B_2B_3P_4B_5B_6P_7B_8B_9P_{10}$.

Furthermore, the exemplary reverse presenter may smooth out CPU usage by decoding the next reference frame of the previous BOF each time a reference frame buffer is freed for the current BOF. That way the next BOF is decoded as soon as the current one is completed.

Decoding and Caching of Selective Reference Frames

Another aspect of the exemplary reverse presenter, discussed in this section, focuses on improved handling of the reference frames (e.g., I-/P-frames) to produce an improved approach to reverse playback of a stream. The improvement provided by this aspect is not based upon its handling of non-reference frames (e.g., B-frames). However, this aspect may be combined with the one described above to further improve the overall reverse playback function.

With this aspect of the exemplary reverse presenter, it selectively maintains uncompressed reference frames (e.g., I-/P-frames) and regenerates others. By doing so, it reduces the amount of temporary memory (e.g., cache) required to reverse playback of a BOF sequence. With this aspect, reverse playback may be performed with only a small number of frame-buffers available in the cache. Herein, a "frame-buffer" is a memory storage location configured to store one uncompressed frame.

Although the exact strategy may vary based upon the exact structure of the BOF sequence, for the sake of clarity the discussion and explanation in this section assumes that each BOF has a single key-frame (e.g., an I-frame) and starts with such. It also assumes that the key-frame is followed by other reference frames (e.g., P-frames) and non-reference frames (e.g., B-frames).

These strategies may be improved by completely prescanning a BOF to discover the number of frames in the BOF in order to select the best decoding strategy.

For a typical MPEG-2 video stream, a third of the frames are I- or P-frames and BOF sizes are approximately 500 ms. This maps to 15 frames and produces a BOF with five reference frames.

Some more complex BOF structures exist that have multiple key-frames (e.g., an I-frames). These may be decomposed into sub-BOF blocks with each having one key-frame when playing in reverse. See section titled, "Extension to BOFs containing B-Frames" below for more on this topic.

The specific strategy employed will vary depending upon the specific BOF structure (e.g., its I-, P- and B-frame composition and ordering) of the BOF sequence that is the subject of the exemplary reverse presenter. Since non-reference frames may be generated from local reference frames, the relative structure of the reference frames is of the most interest to this aspect.

For this aspect of the exemplary reverse presenter, the non-reference frames (e.g., B-frames) may be ignored. Consequently, this aspect focuses on the reference frames. The specific BOF structure of the reference frames discussed here comprises a single I-frame followed by a number n−1 of P-frames. Thus, the number n is the number of reference frames in a BOF structure.

This is a common BOF structure, but those of ordinary skill in the art understand and appreciate that other BOF structures are possible and further understand and appreciate how this aspect may be applied to those other possible structures.

Some BOF structures may require the I-frame from the next BOF to decode the last B-frame (e.g. an MPEG2 "open GOP"). To simplify the description without a loss of generality, the definition of the current BOF may be extended to include the next I-frame of the next BOF. The ending I-frame may be referred to as a 'P-frame' at the end of the current BOF.

The exemplary reverse presenter either determines the number n of reference frames or sets an upper bound for it. To determine this, the exemplary reverse presenter may cache and parse the compressed form of the BOF. Alternatively, it may use a time interval and BOF structure limits to estimate a maximum number of reference frames.

For this discussion, m represents the number of frame-buffers available for temporarily storing decoded reference frames while n represents the number of reference frames in a BOF sequence.

For the trivial situation where n=1 (then there is only a single I-frame), only one frame-buffer is needed. Another trivial situation is where n=2. In this situation, two frame-buffers are required. These two trivial situation assume that there is one (for the n=1 case) or two (for the n=2) case frame-buffer(s).

If n>2, then at least one frame-buffer is for the first I-frame image, and at least one frame-buffer is for the last yet-to-be-presented P-frame image. The remaining frame-buffers (of which there are 1 to n−2 of them) are available for the other yet-to-be-presented P-frame image. Herein, reference to a frame "image" implies that the content of the frame is fully decoded (e.g., uncompressed).

If n≦m, then there are sufficient frame-buffers to decode all reference frames forward and then to present them in reverse order.

Consequently, this aspect of the exemplary reverse presenter is particularly useful when there are more than two reference frames (n>2) and when there are fewer frame-buffers than reference frames (m>n).

Using a selection strategy (such as binary subdivision or other strategies discussed herein), the exemplary reverse presenter selects amongst reference frames that are yet-to-be-presented to decode and store into the frame-buffers.

If not already decoded and stored, it forward-decodes all of the reference frames necessary to decode the selected reference frames. While doing this decoding, it temporarily stores decoded reference frames of the BOF that precede the last yet-to-be-presented reference frame. If a decoded frame is not one of the selected frames, then it is discarded and its frame-buffer is freed.

The exemplary reverse presenter stores the selected frames into the frame-buffers. It presents the last of the stored yet-to-be-presented frames and then frees the frame-buffer that it used. The buffer can be returned to the available pool of free buffers for caching subsequent frames in the decoding process. This observation is a key differentiation between the proposed algorithm and binary subdivision. It allows the proposed algorithm to significantly reduce computational costs.

The exemplary reverse presenter uses its selection strategy again to select another reference frame that is not already decoded and stored in its frame-buffers. It repeats the selection, decoding, storing, and presentation functions above until it presents all of the reference frames of the BOF.

In doing this, the exemplary reverse presenter may very well decode some reference frames more than once. Typically, a decoder has the ability to decode data more rapidly than it is presented. This aspect of the exemplary reverse presenter takes advantage of this available idle time to regenerate uncompressed frames as needed, rather than caching the uncompressed frames well before they are needed.

With the goal of finding a balance between memory resources and computational resources, the exemplary reverse presenter makes decisions between caching or regenerating frames.

Methodological Implementation of the Exemplary Reverse Presenter

Figure 4:
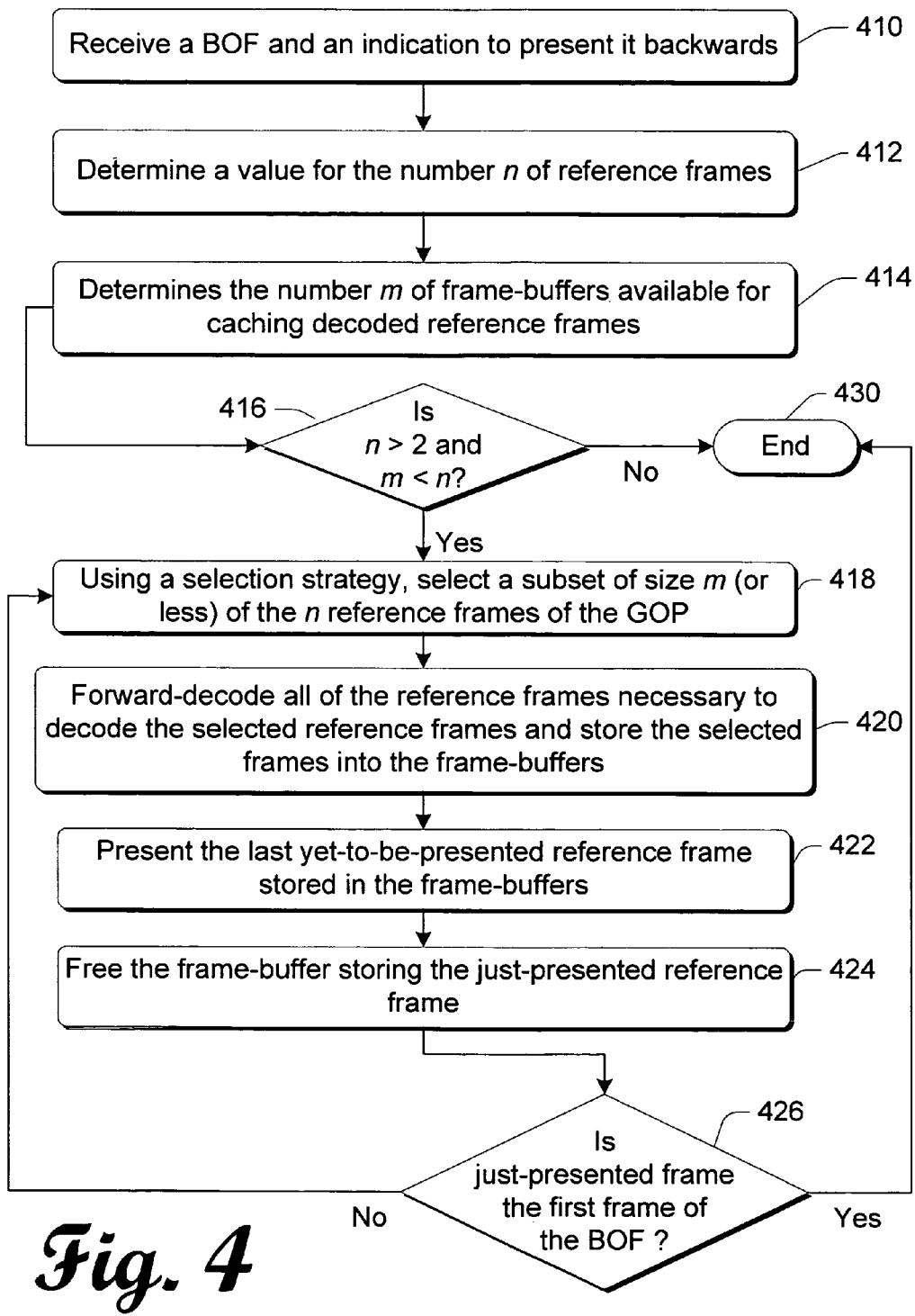
FIG. 4 is a flow diagram showing a methodological implementation described herein.

FIG. 4 shows a methodological implementation of the exemplary reverse presenter for reverse playback that does selective decoding and caching of reference frames. This methodological implementation may be performed in software, hardware, or a combination thereof.

Since this aspect focuses on reference frames, the methodological implementation described below ignores any operation on non-reference frames. However, the methodological implementation described below may be combined with another that operates on non-reference frames (such as the one described above in reference to FIG. 3)

At 410 of FIG. 4, the exemplary reverse presenter receives a BOF and an indication that the received BOF is to be presented backwards (i.e., reverse playback).

At 412, the exemplary reverse presenter determines a value for the number n of reference frames, where n represents the actual number of reference frames in the BOF or an upper bound of reference frames. To determine this, the exemplary reverse presenter may cache and parse the compressed form of the BOF to identify and count reference frames. Alternatively, it may use a time interval and BOF structure limits to estimate a maximum number of reference frames.

At 414, the exemplary reverse presenter determines a value of m, where m represents the number of frame-buffers available for temporarily storing decoded reference frames. It may do this by memory tracking techniques that track specific number of frame-buffers and memory locations available in a memory system. It may also receive this information from such a memory tracking system.

At 416, it determines whether there are more than two reference frames (n>2) and whether there are fewer frame-buffers than reference frames (m<n). If so, the process continues to block 418. Otherwise, this process ends at 430.

At 418 of FIG. 4, the exemplary reverse presenter selects a subset of size m (or less) of the n reference frames of the BOF. If any reference frame has already been presented, then that frame is not included in the subset. Typically, this selection includes at least the I-frame and the last yet-to-be-presented P-frame (where "last" is viewed in a forward direction of the BOF). When there are more than two frame-buffers, then m−2 more of the P-frame (that are between the I-frame and the first yet-to-be-presented P-frame) are also selected.

Numerous selection strategies that may be employed. One strategy may be to use a binary subdivision to select from the remaining reference frames. Depending upon the number of reference frames (n), the exemplary reverse presenter may be configured to employ one of the two selection strategies described below in sub-sections titled "Frame-buffer Selection Strategies For Small n", "Frame-buffers Selection Strategy For Medium n" and "Frame-buffers Selection Strategy For Large n".

At 420, the exemplary reverse presenter forward-decodes all of the reference frames necessary to decode all of the selected reference frames. If a frame needed to decode a selected reference frame is already stored, then there is no need to decode it. In other words, it does nothing to a selected reference frame if it is already decoded and stored in the frame-buffers.

While doing this decoding, each decoded reference frame of the BOF preceding the last yet-to-be-presented reference frame is temporarily stored. If a decoded frame is not one of the selected frames, then it will be discarded and its frame-buffer is free to store one of the selected reference frames.

It stores the selected frames into the frame-buffers. At the end of this function, the frame-buffers store the selected reference frames.

At 422, it presents the last yet-to-be-presented reference frame (e.g., I-/P-frame) stored in the frame-buffers. Since this is a reverse playback of the BOF, presenting the last yet-to-be-presented reference frame produces a reverse presentation of the reference frames of the BOF.

Also, between the presentation of the reference frames, the exemplary reverse presenter may also be presenting any intervening non-reference frames (e.g., B-frames) in reverse as well.

At 424, the exemplary reverse presenter frees the frame-buffer in which the just-presented reference frame is stored. Since the just-presented reference frame is no longer needed for presentation or for further decoding of any other frame, the memory holding it can be freed for other uses.

At 426, if the just-presented reference frame is the first frame of the BOF (e.g., the I-frame), then the process ends with regard to this BOF. Otherwise, it returns to block 418 to repeat blocks 418 through 426. With a frame-buffer freed, up, a new reference frame may be selected upon the return to block 418.

Frame-buffer Selection Strategies for Small n

While the selection of a threshold that divides a "small" n from a "medium" n from a "large" n is not entirely arbitrary, the selection of the threshold typically includes a degree of heuristics. It is largely dependent upon the computational capacity of the actual implementation of the exemplary reverse presenter. For example, the threshold between "small" and "medium" may be on the order of about eight while the threshold between "medium" and "large" may be on the order of about 500-1000. However, one may utilize the concepts described here to adjust that threshold to meet the specific implementation needs.

So, this frame-buffer selection strategy of the exemplary reverse presenter for a small number (n) of reference frames, where $n \leq 8$ and m<n, utilizes the explicit tables below. This strategy may be employed in and around the function described above in block 318 of FIG. 3. These tables were generated by the output of the optimal small n algorithm.

These tables assume that the BOF structure is $I_1 P_2 P_3 \ldots P_N$ and that the relative decoding cost of an I frame is similar to a P frame.

Two Frame-buffers (m=2)

If there are only two frame-buffers (m=2), then the exemplary reverse presenter starts generating at the first frame (e.g., $I_1$) and recursively generates the last to-be-presented frame. It may discard the I frame in favor of caching a later P frame to reduce the length of the first run.

The following table illustrates the number of decodes performed for each reference frame with n=3 to 8:

TABLE 1

| n | $I_1$ | $P_2$ | $P_3$ | $P_4$ | $P_5$ | $P_6$ | $P_7$ | $P_8$ | $P_9$ | Total |
|---|---|---|---|---|---|---|---|---|---|---|
| 3 | 2 | 1 | 1 | n/a | n/a | n/a | n/a | n/a | n/a | 4 |
| 4 | 2 | 2 | 1 | 1 | n/a | n/a | n/a | n/a | n/a | 6 |
| 5 | 2 | 2 | 1 | 2 | 1 | n/a | n/a | n/a | n/a | 8 |
| 6 | 3 | 2 | 2 | 1 | 2 | 1 | n/a | n/a | n/a | 11 |
| 7 | 3 | 3 | 2 | 2 | 1 | 2 | 1 | n/a | n/a | 14 |
| 8 | 3 | 3 | 2 | 3 | 2 | 1 | 2 | 1 | n/a | 17 |
| 9 | 3 | 3 | 3 | 3 | 2 | 1 | 2 | 2 | 1 | 20 |

Three Frame-buffers (m=3)

If there are only three frame-buffers (m=3), then the exemplary reverse presenter generates the first frame, retains a P frame approximately half way and uses the last two frame-buffers frames to and recursively generates the last to-be-presented frame. It stores them in, two of the three frame-buffers. One of the remaining reference frames is selected and stored in the one remaining frame-buffer.

With each recursion of the selection (for selecting which reference frames are stored), generation, and presentation functions, a new last to-be-presented frame is selected and a new reference frame between the first frame and the new last to-be-presented frame is stored in a frame-buffer.

The following table illustrates the number of decodes performed for each reference frame with n=4 to 8:

When m=3, the total number of decodes=2n−3

A typical BOF structure has five reference frames (n=5). So, when m=3, it typically takes eight decodes for the typical BOF structure.

Four Frame-buffers (m=4)

If there are four frame-buffers (m=4), then one additional frame-buffer (when compared to m=3 situation) is available to reduce re-decoding long runs of reference frames. This strategy chooses a frame that is about half-way in the sequence of yet-to-be-presented frames. Doing this helps split the BOF into two halves, where each half is decoded.

TABLE 2

| n | $I_1$ | $P_2$ | $P_3$ | $P_4$ | $P_5$ | $P_6$ | $P_7$ | $P_8$ | Total |
|---|---|---|---|---|---|---|---|---|---|
| 5 | 1 | 1 or 2 | 2 or 1 | 1 | 1 | n/a | n/a | n/a | 6 |
| 6 | 1 | 2 | 1 or 2 | 2 or 1 | 1 | 1 | n/a | n/a | 8 |
| 7 | 1 | 2 | 1 or 2 | 3, 2 or 1 | 2 or 1 | 1 | 1 | n/a | 10 |
| 8 | 2 | 2 | 2 | 2 | 1 | 1 | 1 | 1 | 12 |

This strategy selects frames with the goal of minimizing the size of the one or more span of frames that must be decoded (or re-decoded). In doing so, the overall operation of decoding (and re-decoding as necessary) of the remaining yet-to-be-presented frames is recursively divided into two sub-operations. Each sub-operation may have fewer frame-buffers and may be solved using the smaller cases of n with fewer available frame-buffers m.

For example if n=8 ($I_1P_2P_3P_4P_5P_6P_7P_8$) and we choose to cache frame 4, then the second decoding operation from $P_4 \ldots P_8$ can be regarded as a subproblem with 5 frames and 3 buffers (n=5, m=3—see the n=5 entry in the previous m=3 table). After decoding the second subproblem, the remaining problem to decode $I_1P_2P_3P_4$ becomes the previous subcase of n=4 with m=4 buffers. The selection strategy is still the same as the n=4 and b=4 case, however only 2 more reference frames must be decoded since frames $I_1$ and $P_4$ are cached.

Five Frame-buffers (m=5)

If m=5, and n=6, then only one frame (e.g., frame $P_2$) needs be re-decoded. In total, this results in seven decodes.

If m=5, and n=7, then only two frames need be re-decoded (e.g. $P_2$, $P_3$). This results in nine total decodes.

If m=5, and n=8, then only three frames (e.g., frames $P_2$, $P_3$, and $P_4$) need be re-decoded. This results in eleven total decodes.

TABLE 3

| N | $I_1$ | $P_2$ | $P_3$ | $P_4$ | $P_5$ | $P_6$ | $P_7$ | $P_8$ | Total |
|---|---|---|---|---|---|---|---|---|---|
| 6 | 1 | 2 | 1 | 1 | 1 | 1 | n/a | n/a | 7 |
| 7 | 1 | 2* | 2* | 1* | 1* | 1* | 1 | n/a | 9 |
| 8 | 1 | 2** | 2** | 2** | 1** | 1** | 1** | 1 | 11 |

*any two frames in the range of $P_2$ to $P_5$, selecting the first two may be advantageous for decoding efficiency (cache overlap)
**any three frames in the range of $P_2$ to $P_6$, selecting the first three may be advantageous for decoding efficiency (cache overlap).

Six Frame-buffers (m=6)

If m=6, and n=7, then one frame (e.g., frame $P_4$) needs to be re-decoded. This results in eight total decodes.

If m=6, and n=8, then two frames needs to be re-decoded. This results in ten total decodes.

TABLE 4

| N | $I_1$ | $P_2$ | $P_3$ | $P_4$ | $P_5$ | $P_6$ | $P_7$ | $P_8$ | Total |
|---|---|---|---|---|---|---|---|---|---|
| 7 | 1 | 2* | 1* | 1* | 1* | 1* | 1 | n/a | 8 |
| 8 | 1 | 2** | 2** | 1** | 1** | 1** | 1** | 1 | 10 |

*any frame in the range of $P_2$ to $P_5$, selecting the first one may be advantageous for decoding efficiency (cache overlap)
**any two frames in the range of $P_2$ to $P_6$, selecting the first two may be advantageous for decoding efficiency (cache overlap)

Seven Frame-buffers (m=7)

If m=7, and n=8, then one frame (e.g., frame $P_2$) needs to be re-decoded. This results in nine total decodes.

TABLE 5

| N | $I_1$ | $P_2$ | $P_3$ | $P_4$ | $P_5$ | $P_6$ | $P_7$ | $P_8$ | Total |
|---|---|---|---|---|---|---|---|---|---|
| 8 | 1 | 2* | 1* | 1* | 1* | 1* | 1* | 1 | 9 |

*any frame in the range of $P_2$ to $P_5$, selecting the first one may be advantageous for decoding efficiency (cache overlap)

Summary of Total Decodes

TABLE 6

| n | M = 3 | M = 4 | M = 5 | M = 6 | M = 7 |
|---|---|---|---|---|---|
| 4 | 5 | — | — | — | — |
| 5 | 7 | 6 | — | — | — |
| 6 | 9 | 8 | 7 | — | — |
| 7 | 11 | 10 | 9 | 8 | — |
| 8 | 13 | 12 | 11 | 10 | 9 |

The selection strategy of the exemplary reverse presenter may dramatically reduce the amount of re-decoding while also eliminating the need for large amounts of buffering (which is required of the conventional approaches).

Alternative implementations here may not keep the decoded I-frame available. Indeed, it may discard and decode it again later.

Frame-buffers Selection Strategy for Medium n

So, this frame-buffer selection strategy of the exemplary reverse presenter for a medium number (n) of reference frames, where n greater than about 8 and m<n, utilizes the strategy described below. This strategy may be employed in and around the function described above in block 318 of FIG. 3.

This selection strategy may also be called the "memoization" strategy. In general, "memorization" is an algorithmic technique that saves (i.e., memoizes) a computed result for later reuse, rather than recomputing the result again under the same conditions.

It focuses on recursively breaking BOF into smaller and smaller spans. A span is the frames between selected frames (for caching). A span length is based upon how many frames are in a span. This selection strategy continues to divide spans into still smaller spans until a known combination of a span matches a known combination of frames and buffers.

This frame-buffer selection strategy of the exemplary reverse presenter defines, for decoding and displaying n frames in reverse order using m buffers, the 'first frame to retain' F(m, n). This is the first frame that, after decoding, does not have its buffer immediately freed. The buffer this frame is decoded into will not be freed until the frame has actually been displayed. Arbitrarily, the number of the first frame is chosen to be 1.

This selection strategy defines the number of decodes required to decode and display n frames in reverse order using m buffers using this algorithm as D(m, n). It now computes F(m, n) and D(m, n) recursively. Note that if m>=n D(m, n)=n and F(m, n)=1

If m<n, then recursion is performed by finding the least number of decodes required for all sensible values of the first frame retained—thus deriving F(m, n), and D(m, n) as a byproduct:

The number of decodes required assuming the first frame to retain is x breaks down as:

TABLE 7

| | |
|---|---|
| Decode frames up to and including frame x | x |
| Number of decodes to decode and display frames after x | D(m − 1, n − x) |
| Display frame x | 0 |
| Decode and display frames up to x − 1 | D(m, x − 1) |

The value of x that minimizes the sum of these quantities is F(m, n). The largest value of x that minimizes this sum is arbitrarily chosen to avoid ambiguity.

In computing the recursing, the values of D(i, j) and F(i, j) are collected in an array whose size is m×n. So when a value has been computed once no further search as above is required.

Next, the values of F(i, j) are used to reconstruct the decoding sequence.

Frame-buffers Selection Strategy for Large n

So, this frame-buffer selection strategy of the exemplary reverse presenter for a large number (n) of reference frames, where n greater than about 8 and m<n, utilizes the strategy described below. This strategy may be employed in and around the function described above in block 318 of FIG. 3.

This selection strategy may also be called the "normalized arithmetic span-width sequence" strategy. It focuses on span length. A span is the frames between selected frames (for caching). A span length is based upon how many frames are in a span. This selection strategy attempts to minimize the length of multiple re-decodes of the longest of the multiple spans.

In general, the number of times a frame-buffer is re-decoded is proportional to the length of the span between selected frames—which are cached in the frame-buffers. As cached frames are displayed, their frame-buffers are no longer required and may be reused to cache re-decoded frames.

As the size of n increases, the permutational optimizations of the selection strategy are not as significant as the relative number of frames to decode. The selection strategy endeavors to minimize the span lengths of each "re-decode" block while accounting for the increasing number of frame-buffers as the BOF is decoded.

Starting from the last frame to be decoded, the span lengths are proportional to 1, 2, 3, 4, 5, . . . m−2 (i.e. in frame index order the relative span widths would be m−2, m−1, . . . , 3, 2, 1). At least one frame-buffer is required for the first frame, the $n^{th}$ frame and one adjacent to the $n^{th}$ frame (i.e. at n−1) to decode the last interval. After the last interval is decoded a buffer frees up to decode the next last interval. Thus there are m−3 buffers to place over the interval of n−2 frames. From this, the scaling factor to evenly spread them over the range from 2 . . . n−1 is given by the factor:

$$k = (n-2)/\text{sum}(1 \ldots m-2)$$
$$= (n-2)/((m-2)*(m-1)/2)$$
$$= 2(n-2)/((m-2)*(m-1)).$$

The location of selected frames as a recurrence are:
f(m)=n
f(m−1)=n−1
f(m−1−i)=f(m−i)−round(k*i), for i=1 . . . m−3
f(1)=1

For example, if m=10 frame-buffers are used with n=100 frames, to leave one buffer to decode intervals, then 9 buffers are available so k=2*98/(8*9)=2.7. The following frames f (1 . . . m) would be selected for caching in the frame-buffers:
f(10)=100
f(9)=f(10)−1=99
f(9)=f(10−i)−k*(i), for i=1 . . . 7
   f(8)=f(9)−k*1=99−3=96
   f(7)=f(8)−k*2=96−5=91
   f(6)=f(7)−k*3=91−8=83
   f(5)=f(6)−k*4=83−11=72
   f(4)=f(5)−k*5=72−14=58
   f(3)=f(4)−k*6=58−16=42
   f(2)=f(3)−k*7=42−19=21
f(1)=1
(note: if i=8, f(1)=f(2)−k*8=21−22=−1 which is approximately 1)

So, frames 1, 21, 42, 58, 72, 83, 91, 96, 99 & 100 would be selected for caching.

After decoding a span, the algorithm is recursively applied to the previous span.

During the decoding process, frames 1 to 100 would first be decoded once (to generate the cache points) then the spacing between re-decoded frames would only be 2 frames. This produces a maximum re-decode count for a given frame of at most 3. For example, to decode 91 . . . 96 there is two free frames (from 99 & 100), so 94 and 95 would be cached (re-decode 92, 93, 94, 95). Then 2 frames would be available to decode 91 and 93 (from 95 & 96 freeing up). Similarly for 1 . . . 21 there would be 8 frames available (applying the same arithmetic spacing algorithm, the frames would be a re-decoding cost of 2).

The total decode cost is around 200 (approximately twice) but the memory required is reduced by ten times.

This selection strategy progressively increases the length of each span (relative to the last frame).

In contrast, a binary subdivision algorithm would select frames 1, 50, 75, 87, 93, 96, 99 and 100. On average, each frame would be decoded ln(g) times, for a total of approximately 700 decoding cost. A binary subdivision algorithm does not take advantage of any buffers available over 'm', thereby wasting m−ln(g)=10−7=3 buffers. Our first algorithm uses the extra buffers to reduce the first span to a length of 21 instead of 50.

Extension to BOFs Containing B-Frames

If a BOF contains B-frames the schemes described above, involving using fewer buffers than there are non-reference frames in a BOF, require an extra buffer to be used. This buffer is used to save the last-decoded reference frame until the non-reference frames that reference it are displayed.

Smoothing the Computing Load

It is desirable to balance the cost of decoding frames as equally as possible between each frame display. Minimizing the maximum number of decodes necessary between each frame display can be the most important factor for smooth reverse display of frames.

In this case the schemes described above for reverse display involving using fewer buffers than there are non-reference frames in a BOF can be modified to meet this goal. One way to improve the schemes in this respect is to delay displaying some decoded reference frames where when there are still free buffers than can be used to continue decoding. This is especially important when near the end of reverse-displaying 1 BOF and starting to display the previous BOF. In this case, assuming m frames are available, that when there are m frames left to display each frame buffer will contain one of the first m frames in the BOF. In this case, for example, as soon as the m'th frame has been displayed we have 1 buffer free and, subject to the best load balancing, a number of frames of the previous BOF can be decoded using that free buffer. It can easily be appreciated how further buffers can be used for the decoding the previous BOF can be used as they become free.

Algorithms specifically designed to minimize the maximum number of decodes, or the maximum time for decodes can also be designed.

Decomposition into BOFs with Only One I-Frame

This above discussion and explanation of the exemplary reverse presenter assumes that each BOF has a single key-frame (e.g., an I-frame) and starts with such. It also assumes that the key-frame is followed by other reference frames (e.g., P-frames) and/or non-reference frames (e.g., B-frames).

However, there are more complex BOF structures that exist. These structures have multiple key-frames (e.g., an I-frames). These may be decomposed into sub-BOF groups with each having one key-frame when playing in reverse. For example, the VOBUs of DVD may be viewed as a large BOF composed of many sub-BOF groups.

If a BOF contains multiple I-frames, then it may be decomposed into multiple sub-BOF groups with each having a single I-frame and each sub-BOF group being formed by the span of frames from one I-frame to the next I-frame.

The exemplary reverse presenter performs a block level reverse presentation of the sub-BOF groups. Consequently, the decoding of the frames of each sub-BOF is reversed. The first frame from each sub-BOF group may be cached for the next sub-BOF group to decode.

For example, suppose the input BOF is $I_1B_2B_3P_4B_5B_6I_7B_8B_9P_{10}B_{11}I_{12}B_{13}I_{14}$. The effective sub BOFs from I-frame to I-frame are $BOF_1 = I_1B_2B_3P_4B_5B_6I_7$
$BOF_2 = I_7B_8B_9P_{10}B_{11}I_{12}$
$BOF_3 = I_{12}B_{13}I_{14}$ After $BOF_3$ is decoded, the frame $I_{12}$ may be kept around when generating the $B_{11}$ frame while displaying $BOF_2$.

Therefore, this function may be performed during block 310 of FIG. 3 or block 410 of FIG. 4. During that block's operation, the received BOF is decomposed into multiple sub-BOF groups. The remainder of each process is operated on the sub-BOFs and when completed they return to the beginning to operate on the next sub-BOFs.

Extensions to Other Formats with Complex BOF Structures

In the most common video stream formats, B-frames are exclusively non-reference frames. However, other more complex formats exist—such as the H.264 standard. These formats have more complex BOF structures, such as BOFs with hierarchical reference frames. In these complex formats, B-frames may serve as reference frames for other B-frames.

Figure 5:
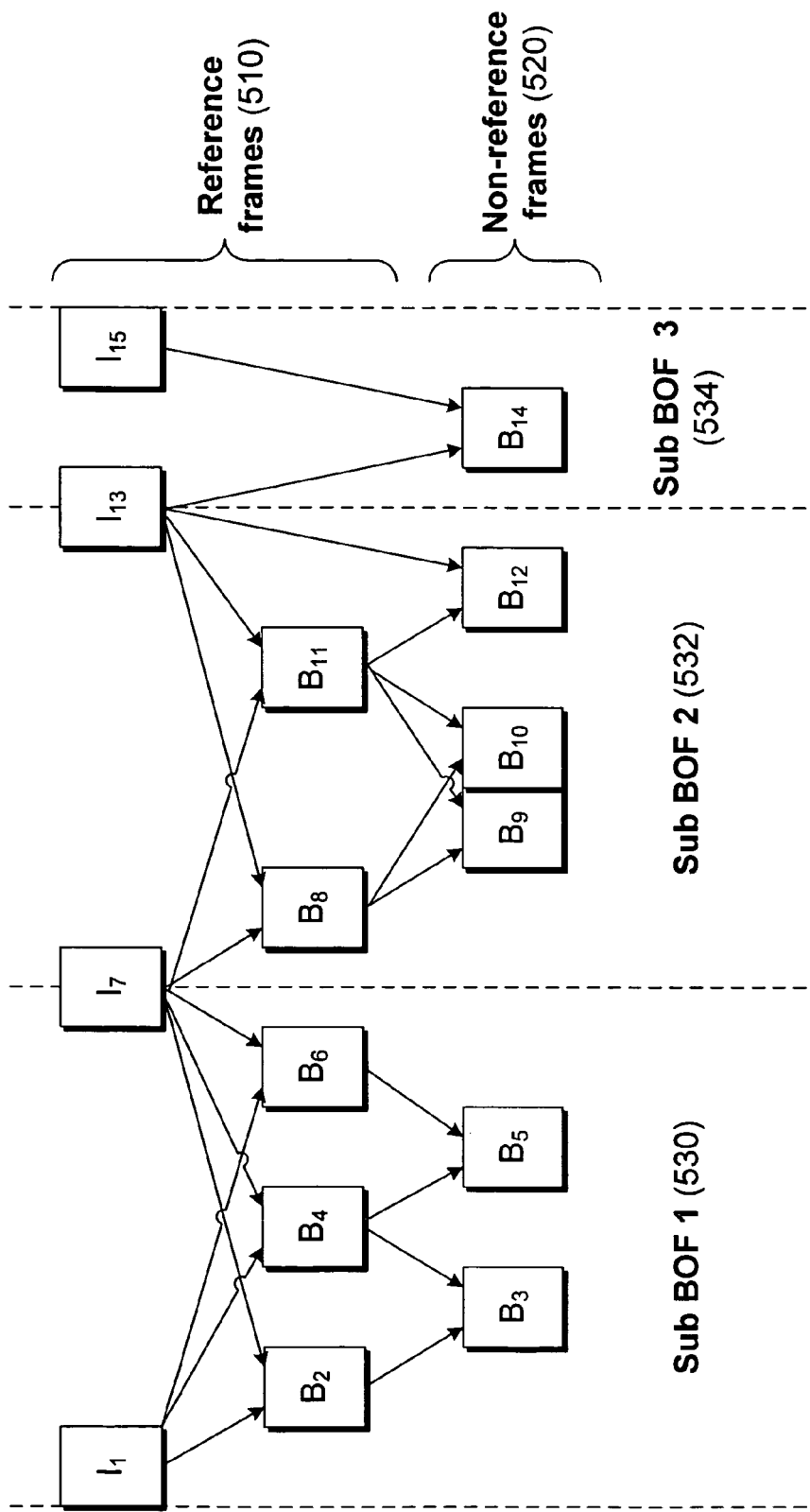
FIG. 5 is a block diagram illustrating a complex group-of-pictures (GOP) that may be used in accordance with an implementation described herein.

For example, suppose the following BOF structure exists for the sequence $I_1B_2B_3B_4B_5B_6I_7B_8B_9B_{10}B_{11}B_{12}I_{13}B_{14}I_{15}$, as illustrated by BOF 500 of FIG. 5.

In this example, the BOF 500 includes reference frames 510 and non-reference frames 520. Some of these reference frames (in particular, $B_2B_4B_6B_8B_{11}B_{14}$) are B-frames and would typically only be non-reference frames. However, in these complex BOF structures with hierarchical reference frames, these B-frames are reference frames because other frames (in particular, $B_3B_5B_9B_{10}B_{12}B_{14}$) depend upon them. It may be decomposed into three sub-BOFs, 530, 532, and 534.

The exemplary reverse presenter performs block reversal decomposition (described above) may be applied to each interval (e.g., each sub-BOF) between reference frames. For example, sub-BOF 3 (534) of FIG. 5 may be reversed and presented. Frame $I_{13}$ may be cached and used to reverse and play sub-BOF 2 (532). Similarly, frame $I_7$ may be cached and used to reverse and play sub-BOF 1 (530). Block reversals may also be applied to sub-BOFs between pseudo-reference frames 515. For example, the sub-BOF 530 of $B_2 \ldots B_6$ may be decomposed into two sub-sub-BOFs consisting of $B_4 \ldots B_6$ and $B_2 \ldots B_4$, respectfully. Each sub-sub-BOF may be independently reversed.

Alternatively, the exemplary reverse presenter may decompose the BOF in another way, such as when it knows the number of reference frames between "interval reference frames". Here, the interval reference frames are the I-frames bounding each space, such as $I_1$, $I_7$, $I_{13}$ and $I_{15}$ in FIG. 5). The sub-BOF 1 (530) interval has five reference and pseudo-reference frames ($I_1B_2B_4B_6I_7$) and two non-reference frames ($B_3B_5$).

By linearizing the BOF hierarchy using a depth first traversal, the exemplary reverse presenter may assign the key-frame caching locations. This distributes a larger number of frame-buffers to branches containing a larger number of frames which need to be re-decoded.

The effective interval width is equal to the number of reference frames in the interval. The number of reference frames in a branch help assign a weight of an interval. The weight of a branch is the minimum number of frame-buffers needed for that interval and all of its sub-intervals.

Extensions to Other Formats with Partial Frame Decoding Dependencies

In the most common video stream formats, a frame is generated is completely generated from other frames. For example, a B frame can be reconstructed from the two adjacent keyframes. However, other more complex formats exist—such as H.264, where a frame can be subdivided into smaller regions. A frame can be split into slices (16 pixel high stripes), slices can be divided into macroblocks (16×16 pixel blocks) and macroblocks can be divided into sub-macroblocks (quarters or halves of macroblocks) and so on.

A frame can be coded as a copy of the previous frame with modifications performed by replacing only pieces of the frame with pieces of other frames and correction factors.

These complications do not affect the approach of the exemplary reverse presenter. A non-reference frame is still defined as a frame which is not used to generate other frames, whereas a frame is a reference frame if it is still required to generate another frame.

For a given GOP, the exemplary reverse presenter creates a directed acyclic dependency graph similar to that shown in FIG. 5.

Methodological Implementation of the Exemplary Reverse Decoder

Figure 6:
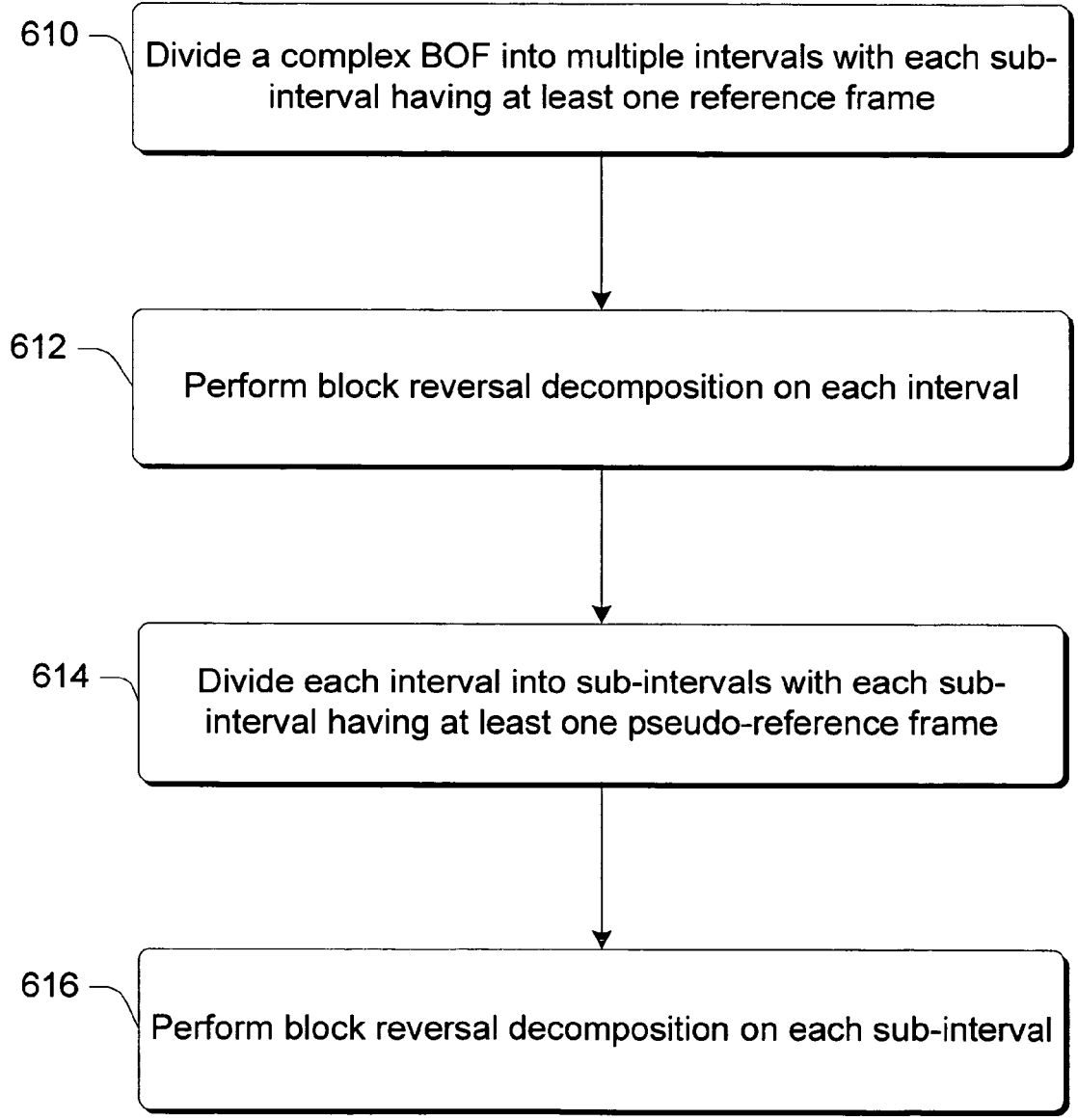
FIG. 6 is a flow diagram showing a methodological implementation described herein.

FIG. 6 shows a methodological implementation of the exemplary reverse presenter performed by the media stream rendering system 200 (or some portion thereof). This methodological implementation may be performed in software, hardware, or a combination thereof.

At 610 of FIG. 6, the exemplary reverse presenter divides a complex BOF into multiple intervals with each sub-interval having at least one reference frame At 612, the exemplary reverse presenter performs block reversal decomposition on each interval.

At 614, it divides each interval into sub-intervals with each sub-interval having at least one pseudo-reference frame.

At 616, the exemplary reverse presenter performs block reversal decomposition on each sub-interval.

Blocks 614 and 616 are repeated for each hierarchical layer of sub-intervals.

Calculating the Cost of Decoding

With at least one implementation of those described herein, the cost of decoding reference frames (e.g., I-/P-frames) is assumed. More particularly, the relative costs of I-frames and P-frames may be assumed.

Rather than assuming these relative decoding costs, an implementation of the techniques described herein may calculate the relative costs of decoding of I-frames and P-frames.

Exemplary Environment

FIG. 7 illustrates an exemplary environment 700 in which the techniques, systems, and other aspects described herein may be implemented (partially or wholly). Exemplary environment 700 is a television entertainment system that facilitates distribution of multi-media. A typical digital video broadcast (DVB) network is an example of such an environment.

The environment 700 includes one or more multimedia content providers 702, a content distribution system 706, and one or more presentation devices 708(1), 708(2), ..., 708(N) coupled to the content distribution system 706 via a broadcast network 710.

Multimedia content provider 702 includes a content server 712 and stored content 714, such as movies, television programs, commercials, music, and similar audio and/or video content. Content server 712 controls distribution of the stored content 714 from content provider 702 to the content distribution system 706. Additionally, content server 702 controls distribution of live content (e.g., content that was not previously stored, such as live feeds) and/or content stored at other locations to the content distribution system 706.

Content distribution system 706 may be coupled to a network 720, such as an intranet or the Internet. The content distribution system 706 includes a broadcast transmitter 728, and one or more content processors 730. Broadcast transmitter 728 broadcasts signals, such as cable television signals, across broadcast network 710.

Content distribution system 706 is representative of a headend service that provides multimedia content to multiple subscribers.

Broadcast network 710 can include a cable television network, RF, microwave, satellite, and/or data network, such as the Internet, and may also include wired or wireless media using any broadcast format or broadcast protocol. Additionally, broadcast network 710 may be any type of network, using any type of network topology and any network communication protocol, and may be represented or otherwise implemented as a combination of two or more networks.

Content processor 730 processes the content received from content provider 702 prior to transmitting the content across broadcast network 708. A particular content processor 730 may encode, or otherwise process, the received content into a format that is understood by the multiple presentation devices 708(1), 708(2), ..., 708(N) coupled to broadcast network 710.

Presentation devices 708 may be implemented in a number of ways. For example, a presentation device 708(1) receives broadcast content from a satellite-based transmitter via a satellite dish 734. Presentation device 708(1) is also referred to as a set-top box or a satellite receiving device. Presentation device 708(1) is coupled to a television 736(1) for presenting the content received by the presentation device (e.g., audio data and video data), as well as a graphical user interface. A particular presentation device 708 may be coupled to any number of televisions 736 and/or similar devices that may be implemented to display or otherwise render content. Similarly, any number of presentation devices 708 may be coupled to a single television 736.

Presentation device 708(2) is also coupled to receive broadcast content from broadcast network 710 and provide the received content to associated television 736(2). Presentation device 708(N) is an example of a combination television 738 and integrated set-top box 740. In this example, the various components and functionality of the set-top box are incorporated into the television, rather than using two separate devices. The set-top box incorporated into the television may receive broadcast signals via a satellite dish (similar to satellite dish 734) and/or via broadcast network 710. In alternate implementations, presentation devices 706 may receive broadcast signals via the Internet or any other broadcast medium.

The exemplary environment 700 also includes stored on-demand content 742, such as Video On-Demand (VOD) movie content. The stored on-demand content may be viewed with a presentation device 708 through an onscreen movie guide, for example, and a viewer can enter instructions to stream a particular movie, or other stored content, down to a corresponding presentation device 708.

Thus far, this exemplary environment 700 has been described in terms of a digital video broadcast (DVB) environment. Indeed, that is an exemplary environment. However, the exemplary reverse presenter may be implemented without the whole of the DVB environment itself. Instead, it may be implemented by a stand-alone presentation device, such as illustrated by device 708(X).

Stand-alone presentation device 708(X) accesses digital video from a storage medium 744, such as a DVD disk. It provides the content from the medium to an associated television 739. Examples of such a stand-alone presentation device include a DVD player, a personal video recorder, etc.

Exemplary Presentation Device

Figure 8:
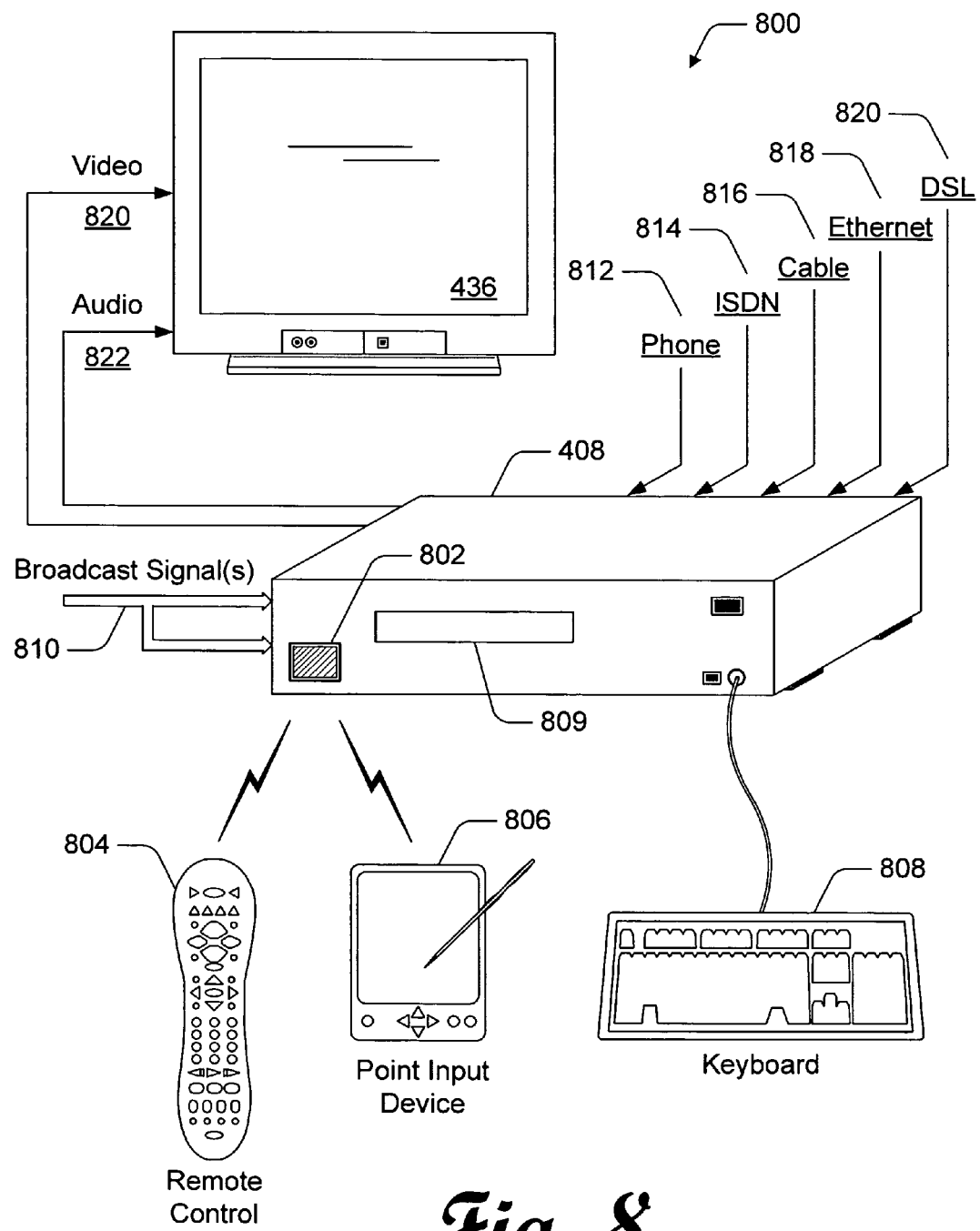
FIG. 8 illustrates of an example presentation device, a television, and various input devices that interact with the presentation device.

FIG. 8 illustrates an exemplary implementation 800 of a presentation device 708 shown as a stand-alone unit that connects to a television 736. Presentation device 708 may be implemented in any number of embodiments, including as a set-top box, a satellite receiver, a TV recorder with a hard disk, a game console, an information appliance, a DVD player, a personal video recorder, and so forth.

Presentation device 708 includes a wireless receiving port 802, such as an infrared (IR) or Bluetooth wireless port, for receiving wireless communications from a remote control device 804, a handheld input device 806, or any other wireless device, such as a wireless keyboard. Handheld input device 806 may be a personal digital assistant (PDA), handheld computer, wireless phone, or the like. Additionally, a wired keyboard 808 is coupled to communicate with the presentation device 708. In alternate embodiments, remote control device 804, handheld device 806, and/or keyboard 808 may use an RF communication link or other mode of transmission to communicate with presentation device 708.

Presentation device 708 may have a storage medium reader 809 for reading content storage media, such as DVD disks. A stand-alone or non-stand-alone presentation device 708 may include the storage medium reader 809.

Presentation device 708 may receive one or more broadcast signals 810 from one or more broadcast sources, such as from a satellite or from a broadcast network. Presentation device 708 includes hardware and/or software for receiving and decoding broadcast signal 810, such as an NTSC, PAL, SECAM or other TV system video signal.

Presentation device 708 also includes hardware and/or software for providing the user with a graphical user interface by which the user can, for example, access various network services, configure the presentation device 708, and perform other functions.

Presentation device 708 may be capable of communicating with other devices via one or more connections including a conventional telephone link 812, an ISDN link 814, a cable link 816, an Ethernet link 818, a DSL link 820, and the like. Presentation device 708 may use any one or more of the various communication links 812-820 at a particular instant to communicate with any number of other devices.

Presentation device 708 generates video signal(s) 820 and audio signal(s) 822, both of which are communicated to television 736. The video signals and audio signals may be communicated from presentation device 708 to television 736 via an RF (radio frequency) link, S-video link, composite video link, component video link, or other communication link.

Although not shown in FIG. 8, the presentation device 708 may include one or more lights or other indicators identifying the current status of the device. Additionally, the presentation device may include one or more control buttons, switches, or other selectable controls for controlling operation of the device.

FIG. 9 illustrates selected components of presentation device 708 shown in FIGS. 7 and 8. Presentation device 708 includes a first tuner 900 and an optional second tuner 902. These tuners may be called the receiving unit. The tuners 900 and 902 are representative of one or more in-band tuners that tune to various frequencies or channels to receive television signals, as well as an out-of-band tuner that tunes to the broadcast channel over which other content may be broadcast to presentation device 708.

Presentation device 708 also includes one or more processors 304 and one or more memory components. Examples of possible memory components include a random access memory (RAM) 906, a disk drive 908, a mass storage component 910, and a non-volatile memory 912 (e.g., ROM, Flash, EPROM, EEPROM, etc.).

Alternative implementations of presentation device 708 can include a range of processing and memory capabilities, and may include more or fewer types of memory components than those illustrated in FIG. 9.

Processor(s) 904 process various instructions to control the operation of presentation device 708 and to communicate with other electronic and computing devices. The memory components (e.g., RAM 906, disk drive 908, storage media 910, and non-volatile memory 912) store various information and/or data such as multimedia content, electronic program data, web content data, configuration information for presentation device 708, and/or graphical user interface information. The device may cache data into any one of these many memory components.

An operating system 914 and one or more application programs 916 may be stored in non-volatile memory 912 and executed on processor 904 to provide a runtime environment. A runtime environment facilitates extensibility of presentation device 708 by allowing various interfaces to be defined that, in turn, allow application programs 916 to interact with presentation device 708.

The application programs 916 that may be implemented at presentation device 708 can include an electronic program guide (EPG), an email program to facilitate electronic mail, and so on.

Presentation device 708 can also include other components pertaining to a television entertainment system which are not illustrated in this example for simplicity purposes. For instance, presentation device 708 can include a user interface application and user interface lights, buttons, controls, etc. to facilitate viewer interaction with the device.

Presentation device 708 also includes a decoder 920 to decode a broadcast 19 video signal, such as an NTSC, PAL, SECAM or other TV system video signal. It may also be a decoder for decoding a digital compressed video stream, such as one formed as MPEG This may be same type of decoder as the decoders 210, 212, and 214 of FIG. 2.

Presentation device 708 further includes a wireless interface 922, a network interface 924, a serial and/or parallel interface 926, and a modem 928. Wireless interface 922 allows presentation device 708 to receive input commands and other information from a user-operated input device, such as from a remote control device or from another IR, Bluetooth, or similar RF input device.

Network interface 924 and serial and/or parallel interface 926 allow presentation device 708 to interact and communicate with other electronic and computing devices via various communication links. Although not shown, presentation device 708 may also include other types of data communication interfaces to communicate with other devices. Modem 928 facilitates presentation device 708 communication with other electronic and computing devices via a conventional telephone line.

Presentation device 708 also includes an audio/video output 930 that provides signals to a television or other device that processes and/or presents or otherwise renders the audio and video data. This output may be called the display.

Presentation device 708 also includes a decoding controller 940 that partially or wholly implements the exemplary reverse presenter. It may be application program or a hardware component (or a combination of both).

Although shown separately, some of the components of presentation device 708 may be implemented in an application specific integrated circuit (ASIC). Additionally, a system bus (not shown) typically connects the various components within presentation device 708.

Exemplary Computing System and Environment

FIG. 10 illustrates an example of a suitable computing environment 1000 within which an exemplary reverse presenter, as described herein, may be implemented (either fully or partially). The computing environment 1000 may be utilized in the computer and network architectures described herein.

The exemplary computing environment 1000 is only one example of a computing environment and is not intended to suggest any limitation as to the scope of use or functionality of the computer and network architectures. Neither should the computing environment 1000 be interpreted as having any dependency or requirement relating to any one or combination of components illustrated in the exemplary computing environment 1000.

The exemplary reverse presenter may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, main-frame computers, distributed computing environments that include any of the above systems or devices, and the like.

The exemplary reverse presenter may be described in the general context of computer-executable instructions, such as program modules, being executed by a computer. Generally, program modules include routines, programs, objects, components, data structures, etc. that perform particular tasks or implement particular abstract data types. The exemplary reverse presenter may also be practiced in distributed computing environments where tasks are performed by remote processing devices that are linked through a communications network. In a distributed computing environment, program modules may be located in both local and remote computer storage media including memory storage devices.

The computing environment 1000 includes a general-purpose computing device in the form of a computer 1002, which may be another example of the presentation device 708. The components of computer 1002 may include, by are not limited to, one or more processors or processing units 1004, a system memory 1006, and a system bus 1008 that couples various system components including the processor 1004 to the system memory 1006.

The system bus 1008 represents one or more of any of several types of bus structures, using any of a variety of bus architectures, including a memory bus or memory controller, a peripheral bus, an accelerated graphics port, or a local bus using any of a variety of bus architectures. By way of example, such architectures can include a CardBus, Personal Computer Memory Card International Association (PCM-CIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus also known as a Mezzanine bus.

Computer 1002 typically includes a variety of computer readable media. Such media may be any available media that is accessible by computer 1002 and includes both volatile and non-volatile media, and removable and non-removable media.

The system memory 1006 includes computer readable media in the form of volatile memory, such as random access memory (RAM) 1010, and/or non-volatile memory, such as read only memory (ROM) 1012. A basic input/output system (BIOS) 1014, containing the basic routines that help to transfer information between elements within computer 1002, such as during start-up, is stored in ROM 1012. RAM 1010 typically contains data and/or program modules that are immediately accessible to and/or presently operated on by the processing unit 1004.

Computer 1002 may also include other removable/non-removable, volatile/non-volatile computer storage media. By way of example, FIG. 10 illustrates a hard disk drive 1016 for reading from and writing to a non-removable, non-volatile magnetic media (not shown), a magnetic disk drive 1018 for reading from and writing to a removable, non-volatile magnetic disk 1020 (e.g., a "floppy disk"), and an optical disk drive 1022 for reading from and/or writing to a removable, non-volatile optical disk 1024, such as a CD-ROM, DVD-ROM, or other optical media. The hard disk drive 1016, magnetic disk drive 1018, and optical disk drive 1022 are each connected to the system bus 1008 by one or more data media interfaces 1026. Alternatively, the hard disk drive 1016, magnetic disk drive 1018, and optical disk drive 1022 may be connected to the system bus 1008 by one or more interfaces (not shown).

The disk drives and their associated computer-readable media provide non-volatile storage of computer readable instructions, data structures, program modules, and other data for computer 1002. Although the example illustrates a hard disk 1016, a removable magnetic disk 1020, and a removable optical disk 1024, it is to be appreciated that other types of computer readable media which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 1016, magnetic disk 1020, optical disk 1024, ROM 1012, and/or RAM 1010, including, by way of example, an operating system 1026, one or more application programs 1028, other program modules 1030, and program data 1032.

A user may enter commands and information into computer 1002 via input devices, such as a keyboard 1034 and a pointing device 1036 (e.g., a "mouse"). Other input devices 1038 (not shown specifically) may include a microphone, joystick, game pad, satellite dish, serial port, scanner, and/or the like. These and other input devices are connected to the processing unit 1004 via input/output interfaces 1040 that are coupled to the system bus 1008, but may be connected by other interface and bus structures, such as a parallel port, game port, or a universal serial bus (USB).

A monitor 1042 or other type of display device may also be connected to the system bus 1008 via an interface, such as a video adapter 1044. In addition to is the monitor 1042, other output peripheral devices may include components, such as speakers (not shown) and a printer 1046, which may be connected to computer 1002 via the input/output interfaces 1040.

Computer 1002 may operate in a networked environment using logical connections to one or more remote computers, such as a remote computing device 1048. By way of example, the remote computing device 1048 may be a personal computer, portable computer, a server, a router, a network computer, a peer device or other common network node, and the like. The remote computing device 1048 is illustrated as a portable computer that may include many or all of the elements and features described herein relative to computer 1002.

Logical connections between computer 1002 and the remote computer 1048 are depicted as a local area network (LAN) 1050 and a general wide area network (WAN) 1052. Such networking environments are commonplace in offices, enterprise-wide computer networks, intranets, and the Internet.

When implemented in a LAN networking environment, the computer 1002 is connected to a local network 1050 via a network interface or adapter 1054. When implemented in a WAN networking environment, the computer 1002 typically includes a modem 1056 or other means for establishing communications over the wide network 1052. The modem 1056, which may be internal or external to computer 1002, may be connected to the system bus 1008 via the input/output interfaces 1040 or other appropriate mechanisms. It is to be appreciated that the illustrated network connections are exemplary and that other means of establishing communication link(s) between the computers 1002 and 1048 may be employed.

In a networked environment, such as that illustrated with computing environment 1000, program modules depicted relative to the computer 1002, or portions thereof, may be stored in a remote memory storage device. By way of example, remote application programs 1058 reside on a memory device of remote computer 1048.

For purposes of illustration, application programs and other executable program components, such as the operating system, are illustrated herein as discrete blocks, although it is recognized that such programs and components reside at various times in different storage components of the computing device 1002 and are executed by the data processor(s) of the computer.

Computer-Executable Instructions

An implementation of an exemplary reverse presenter may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of an exemplary reverse presenter may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above are also included within the scope of computer readable media.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer storage medium having computer-executable instructions that, when executed, directs a computer to perform a method facilitating the reverse presentation of a block-of-frames (BOF) of a media stream, the BOF being a sequence of frames having a defined forward presentation order, each being categorized as either a reference or non-reference frame, a reference frame being a frame with data that at least one other frame in the BOF uses as a reference for decoding its own encoded data and a non-reference frame being a frame having encoded data that is not referenced by another frame in the BOF, the method comprising:

obtaining a BOF of a media stream;

forward-decoding and storing one or more decoded reference frames of the BOF;

storing non-reference frames of the BOF with its data still encoded;

in reverse order of the sequence starting with the last frame of the sequence, repeating the following for each sub-sequence containing non-reference frames and at least adjacent one reference frame and continuing the repeating until reaching the first frame:

if a next-to-be-presented frame in reverse order is a reference frame, then presenting that reference frame in the BOF;

generating a next yet-to-be-presented sub-sequence of non-reference frames in the BOF;

presenting, in reverse order of the sequence, the one or more of the just-generated non-reference frames;

releasing memory that stored a just-presented non-reference frame; and if a next-to-be-presented frame in reverse order is a reference frame, then presenting that reference frame in the BOF;

presenting the first reference frame of the sequence.

2. A medium, as recited in claim 1, wherein the presentation of each of the just-generated non-reference frames occurs after the generation of each non-reference frame of the next yet-to-be-presented sub-sequence.

3. A medium, as recited in claim 1, wherein the releasing occurs after presentation of all reference frames that the just-presented non-reference frame references.

4. A medium, as recited in claim 1 further comprising releasing memory that stored one or more just-presented reference frames.

5. A medium, as recited in claim 1, wherein the method further comprises:

receiving a super-BOF comprised of multiple BOFs in a sequence, wherein each BOF has one key-frame, which depends upon no other frame for decoding;

decomposing the super-BOF into multiple BOFs;

repeating the steps recited in claim 1, where a different one of the multiple BOFs are provided to the obtaining step in reverse order of the sequence of BOFs in the super-BOF.

6. A medium, as recited in claim 1, wherein the method further comprises:

receiving a super-BOF comprised of multiple BOFs in a sequence, wherein each BOF has one key-frame at the start of the sequence which depends upon no other frame for decoding and one keyframe at the end of the sequence which depends upon no other frame for decoding but may be part of the next logical BOF;

decomposing the super-BOF into multiple BOFs;

repeating the steps recited in claim 1, where a different one of the multiple BOFs are provided to the obtaining step in reverse order of the sequence of BOFs in the super-BOF.

7. A computing device comprising:

an input device configured to receive a media stream;

a display device configured to display the presented frames;

a medium, as recited in claim 1.

8. A computer storage medium having computer-executable instructions that, when executed, directs a computer to perform a method facilitating the reverse presentation of a block-of-frames (BOF) of a media stream, the BOF being a sequence of frames having a defined forward presentation order comprising a key-frame followed by multiple encoded frames that are progressively dependent upon one or more frames preceding it in the sequence for generation, the method comprising:

obtaining a BOF of a media stream;

starting at the end of the BOF, repeating, for all non-key-frames of the BOF presented:

selecting one or more frames of those that are yet-to-be-presented;

in reverse order, determining which frame is the next of the frames that are yet-to-be-presented;

if the next yet-to-be-presented frame has been generated and is stored in a memory, then presenting the next yet-to-be-presented frame, otherwise:

generating the frames preceding the next yet-to-be-presented frame that are necessary for generation of the next yet-to-be-presented frame but generating only those frames that are not already stored in the memory, during the generating, storing the generated frames selected by the selecting, further generating the next yet-to-be-presented frame;

presenting the next yet-to-be-presented frame;

until the key-frame of the BOF is presented, repeating the actions of the selecting, the determining, and the if . . . then . . . otherwise conditional actions, as the conditions merits.

9. A medium, as recited in claim 8, wherein the generating and further generating comprises decoding frames based upon its own data and based upon data of other frames in the BOF.

10. A medium, as recited in claim 8, wherein the storing comprises storing only the generated frames selected by the selecting.

11. A medium, as recited in claim 8, wherein after the presenting, the method further comprises releasing memory that stored the just-presented frame.

12. A medium, as recited in claim 8, wherein the method further comprises:

storing non-reference frames of the BOF with its data still encoded, a non-reference frame being a frame having encoded data that is not referenced by another frame in the BOF;

in reverse order of the sequence, selectively decoding non-reference frames.

13. A medium, as recited in claim 8, wherein the method further comprises:

storing non-reference frames of the BOF with its data still encoded, a non-reference frame being a frame having encoded data that is not referenced by another frame in the BOF;

in reverse order of the sequence, selectively decoding reference and non-reference frames.

14. A medium, as recited in claim 8, wherein the selecting comprises:

determining a number m of available frame-buffers of the memory, each frame-buffer being capable of storing a decoded frame;

mapping the relative locations of the remaining yet-to-be-presented frames of the sequence;

performing a binary subdivision to identify substantially about m frames for selection.

15. A medium, as recited in claim 8, wherein the selecting comprises:

determining a number m of available frame-buffers of the memory, each frame-buffer being capable of storing a decoded reference frame;

mapping the relative locations of the remaining yet-to-be-presented frames of the sequence;

performing a binary subdivision to identify substantially about m frames for selection.

16. A medium, as recited in claim 8, wherein the selecting comprises:

determining a number m of available frame-buffers of the memory, each frame-buffer being capable of storing a decoded frame;

mapping the relative locations of the remaining yet-to-be-presented frames of the sequence;

performing a binary subdivision to identify m or fewer frames for selection.

17. A medium, as recited in claim 8, wherein the selecting comprises:

determining a number m of available frame-buffers of the memory, each frame-buffer being capable of storing a decoded reference frame;

mapping the relative locations of the remaining yet-to-be-presented frames of the sequence;

performing a binary subdivision to identify m or fewer frames for selection.

18. A medium, as recited in claim 8, wherein the selecting comprises:

determining a number m of available frame-buffers of the memory, each frame-buffer being capable of storing a decoded frame;

mapping the relative locations of the remaining yet-to-be-presented frames of the sequence;

performing a recursive subdivision to identify substantially about m frames for selection, wherein the selection of frames is weighted more heavily towards the end of the remaining yet-to-be-presented frames of the sequence.

19. A medium, as recited in claim 8, wherein the selecting comprises:

determining a number m of available frame-buffers of the memory, each frame-buffer being capable of storing a decoded reference frame;

mapping the relative locations of the remaining yet-to-be-presented frames of the sequence;

performing a recursive subdivision to identify substantially about m frames for selection, wherein the selection of frames is weighted more heavily towards the end of the remaining yet-to-be-presented frames of the sequence.

20. A medium, as recited in claim 8, wherein the selecting comprises:

determining a number m of available frame-buffers of the memory, each frame-buffer being capable of storing a decoded frame;

mapping the relative locations of the remaining yet-to-be-presented frames of the sequence;

performing a recursive subdivision to identify substantially about m frames for selection, wherein the selection of frames is weighted more heavily towards the end of the remaining yet-to-be-presented frames of the sequence and the selection of the frames produces a spacing which is proportional to a reversed arithmetic sequence.

21. A medium, as recited in claim 8, wherein the selecting comprises:
    determining a number m of available frame-buffers of the memory, each frame-buffer being capable of storing a decoded frame;
    mapping the remaining yet-to-be-presented frames of the sequence;
    referencing one or more selection tables stored in a memory to identify m or fewer frames for selection.

22. A medium, as recited in claim 8, wherein the selecting comprises:
    determining a number m of available frame-buffers of the memory, each frame-buffer being capable of storing a decoded reference frame;
    mapping the remaining yet-to-be-presented frames of the sequence;
    referencing one or more selection tables stored in a memory to identify m or fewer frames for selection.

23. A medium, as recited in claim 8, wherein the method further comprises:
    receiving a super-BOF comprised of multiple BOFs in a sequence, wherein each BOF has one key-frame which depends upon no other frame for decoding;
    decomposing the super-BOF into multiple BOFs;
    repeating the steps recited in claim 8, where a different one of the multiple BOFs are provided to the obtaining step in reverse order of the sequence of BOFs in the super-BOF.

24. A medium, as recited in claim 8 further comprising calculating a cost of decoding frames.

25. A medium, as recited in claim 8 further comprising calculating a cost of key frames and progressively dependent frames of a set of BOFs.

26. A computing device comprising:
    an input device configured to receive a media stream;
    a display device configured to display the presented frames;
    a medium, as recited in claim 8.

27. A computer storage medium having computer-executable instructions that, when executed, directs a computer to perform a method facilitating the reverse presentation of a block-of-frames (BOF) of a media stream, the BOF being a sequence of frames having a defined forward presentation order comprising a key-frame followed by multiple encoded frames that are progressively dependent upon one or more frames preceding it in the sequence for decoding, the method comprising:
    obtaining a BOF of a media stream;
    starting at the end of the BOF, repeating, for all non-key-frames of the BOF presented:
        in reverse order, presenting a next to-be-presented frame,
        before presentation of the next yet-to-be-presented frame, forward-decoding the frames preceding the next yet-to-be-presented frame that are necessary for decoding of the next yet-to-be-presented frame,
        selecting which of the decoded frames to store in a memory, wherein the selected decoded frames are fewer than all of the frames of the BOF,
            determining a number m of available frame-buffers of the memory, each frame-buffer being capable of storing a decoded frame,
            mapping the relative locations of the remaining yet-to-be-presented frames of the sequence,
            performing a recursive subdivision to identify substantially about m frames for selection,
            storing the selected decoded frames;
    further presenting the key-frame.

28. A medium, as recited in claim 27, wherein the selected decoded frames are reference frames.

29. A medium, as recited in claim 27, wherein frames that are already decoded and stored in the memory are excluded from the forward-decoding.

30. A medium, as recited in claim 27, wherein frames that are already decoded and stored in the memory are excluded from the forward-decoding and these excluded frames may be amongst the frames selected by the selecting.

31. A medium, as recited in claim 27, wherein after the presenting, the method further comprises releasing memory that stored the just-presented frame.

32. A medium, as recited in claim 27, wherein the memory is used to further aid decoding frames.

33. A medium, as recited in claim 27, wherein the method further comprises:
    storing non-reference frames of the BOF with its data still encoded, a non-reference frame being a frame having encoded data that is not referenced by another frame in the BOF;
    in reverse order of the sequence, selectively decoding non-reference frames.

34. A medium, as recited in claim 27, wherein the selected decoded frames are reference frames and wherein the method further comprises:
    storing non-reference frames of the BOF with its data still encoded, a non-reference frame being a frame having encoded data that is not referenced by another frame in the BOF;
    in reverse order of the sequence, selectively decoding non-reference frames.

35. A medium, as recited in claim 27, wherein the selecting comprises:
    determining a number m of available frame-buffers of the memory, each frame-buffer being capable of storing a decoded frame;
    mapping the relative locations of the remaining yet-to-be-presented frames of the sequence;
    performing a recursive subdivision to identify m or fewer frames for selection.

36. A medium, as recited in claim 27, wherein the selecting comprises:
    determining a number m of available frame-buffers of the memory, each frame-buffer being capable of storing a decoded frame;
    mapping the relative locations of the remaining yet-to-be-presented frames of the sequence;
    performing a recursive subdivision to identify substantially about m frames for selection, wherein the selection of frames is weighted more heavily towards the end of the remaining yet-to-be-presented frames of the sequence.

37. A medium, as recited in claim 27, wherein the selecting comprises:
    determining a number m of available frame-buffers of the memory, each frame-buffer being capable of storing a decoded frame;
    mapping the relative locations of the remaining yet-to-be-presented frames of the sequence;
    performing a recursive subdivision to identify substantially about m frames for selection, wherein the selection of frames is weighted more heavily towards the end of the remaining yet-to-be-presented frames of the sequence and the selection of the frames produces a spacing which is proportional to a reversed arithmetic sequence.

38. A medium, as recited in claim 27, wherein the selecting comprises:

determining a number m of available frame-buffers of the memory, each frame-buffer being capable of storing a decoded frame;

mapping the remaining yet-to-be-presented frames of the sequence;

referencing one or more selection tables stored in a memory to identify m or fewer frames for selection.

39. A medium, as recited in claim 27, wherein the method further comprises:

receiving a super-BOF comprised of multiple BOFs in a sequence, wherein each BOF has one key-frame;

decomposing the super-BOF into multiple BOFs;

repeating the steps recited in claim 27, where a different one of the multiple BOFs are provided to the obtaining step in reverse order of the sequence of BOFs in the super-BOF.

40. A medium, as recited in claim 27, wherein the method further comprises:

receiving a set of frames wherein decoding a frame has dependencies on pieces of other frames;

determining a number m of available frame-buffers or frame-buffer pieces of the memory, each frame-buffer piece being capable of storing part of a decoded frame;

mapping the remaining completed yet-to-be-presented frame pieces of the sequence;

referencing one or more selection tables stored in a memory or using a selection strategy to identify m or fewer frame pieces for selection.

41. A medium, as recited in claim 40, wherein the method further comprises:

a frame piece comprises of a slice, macroblock, submacroblock or a piece of submacroblock.

42. A medium, as recited in claim 27 further comprising calculating a cost of decoding frames.

43. A computing device comprising:

an input device configured to receive a media stream;

a display device configured to display the presented frames;

a medium, as recited in claim 27.

* * * * *